(12) United States Patent
Shi et al.

(10) Patent No.: US 11,812,299 B2
(45) Date of Patent: Nov. 7, 2023

(54) ENABLING A NON-PUBLIC NETWORK COMMUNICATION

(71) Applicant: Sony Group Corporation, Tokyo (JP)

(72) Inventors: Xiaoyan Shi, Quebec (CA); Guanzhou Wang, Quebec (CA); Saad Ahmad, Quebec (CA)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/291,646

(22) PCT Filed: Nov. 14, 2019

(86) PCT No.: PCT/US2019/061448
§ 371 (c)(1),
(2) Date: May 6, 2021

(87) PCT Pub. No.: WO2020/102512
PCT Pub. Date: May 22, 2020

(65) Prior Publication Data
US 2021/0410001 A1 Dec. 30, 2021

Related U.S. Application Data

(60) Provisional application No. 62/768,434, filed on Nov. 16, 2018.

(51) Int. Cl.
*H04W 28/02* (2009.01)
*H04W 28/24* (2009.01)
*H04W 84/04* (2009.01)

(52) U.S. Cl.
CPC ... *H04W 28/0268* (2013.01); *H04W 28/0263* (2013.01); *H04W 28/24* (2013.01); *H04W 84/042* (2013.01)

(58) Field of Classification Search
None
See application file for complete search history.

(56) References Cited

U.S. PATENT DOCUMENTS

2018/0324633 A1* 11/2018 Lee .................. H04W 8/04
2019/0116520 A1* 4/2019 Chaponniere ........... H04W 4/20
(Continued)

FOREIGN PATENT DOCUMENTS

| CN | 111182580 A | 5/2020 |
| EP | 1 638 262 A1 | 3/2006 |

(Continued)

OTHER PUBLICATIONS

International Search Report and Written Opinion dated Feb. 21, 2020 received for PCT Application No. PCT/US2019/061448, Filed on Nov. 14, 2019, 13 pages.
(Continued)

*Primary Examiner* — Diane L Lo
(74) *Attorney, Agent, or Firm* — XSENSUS LLP

(57) ABSTRACT

Systems, methods, and instrumentalities are disclosed for determining corresponding quality of service (QoS) information that are utilized in a first network for different data associated with a second network. The data may include control plane data and user plane data. A wireless transmit/receive unit (WTRU) may send a request to the first network to establish a first session with the first network for transmission of the data associated with a second network. The WTRU may receive one or more QoS mapping rules. The one or more QoS mapping rules may include information for mapping a first QoS indication to a packet comprising control plane data associated with the second network and information for mapping a second QoS indication to a packet comprising user plane data associated with the sec-
(Continued)

ond network. The WTRU may use the one or more QoS mapping rules to determine a QoS indication for a packet.

20 Claims, 17 Drawing Sheets

(56) References Cited

U.S. PATENT DOCUMENTS

| | | | | |
|---|---|---|---|---|
| 2020/0275302 | A1* | 8/2020 | Youn | H04W 28/0268 |
| 2021/0144579 | A1* | 5/2021 | Ke | H04W 76/12 |
| 2022/0007180 | A1 | 1/2022 | Liao | |

FOREIGN PATENT DOCUMENTS

| | | |
|---|---|---|
| JP | 2013197874 A | 9/2013 |
| JP | 2022519173 A | 3/2022 |
| WO | WO-2018061901 A1 | 4/2018 |

OTHER PUBLICATIONS

3rd Generation Partnership Project; Technical Specification Group Services and System Aspects; Study on 5GS Enhanced support of Vertical and LAN Services (Release 16), 3GPP TR 23.734, V0.3 0, Oct. 2018, pp. 1-94.

Interdigital Inc., "Update to Solution #20 on QoS flow", 3GPP Draft, S2-1812028, Nov. 26-30, 2018, pp. 1-10.

Vivo, "Discussion on the QoS issue when accessing to PLMN services via NPN and vise versa", 3GPP Draft S2-1900145, Jan. 21-25, 2019, pp. 1-3.

vivo, Solution for accessing to Non Public Network services via PLMN, 3GPP TSG SA WG2 #129 S2-1810200, Internet<URL: https://www.3gpp.org/ftp/tsg_sa/WG2_Arch/TSGS2_129_Dongguan/Docs/S2-1810200.zip> , Sep. 10, 2018.

* cited by examiner

ENABLING A NON-PUBLIC NETWORK COMMUNICATION

CROSS-REFERENCE TO RELATED CASES APPLICATIONS

The present application is based on PCT filing PCT/US2019/061448, filed Nov. 14, 2019, which claims the benefit of U.S. Provisional Patent Application No. 62/768,434, filed Nov. 16, 2018, the entire contents of each are incorporated herein by reference in its entirety.

BACKGROUND

Wireless communication systems continue to evolve. A fifth generation may be referred to as 5G. An example of a previous generation of mobile communication system may be referred to as fourth (4G) long term evolution (LTE).

SUMMARY

Systems, methods, and instrumentalities are disclosed for determining corresponding quality of service (QoS) information that are utilized in a first network for different data associated with a second network. The data may include control plane data and user plane data.

For example, a wireless transmit/receive unit (WTRU) may be configured to send non-public network (NPN) data associated with a NPN network via a public land mobile network (PLMN). The NPN data may include user plane data for a session associated with the NPN network and control plane data for the session associated with the NPN network. The WTRU may send the data associated with the NPN network session by encapsulating NPN data in PLMN packets. The WTRU may select or apply QoS indications or values to the PLMN packets comprising NPN data based on one or more QoS mapping rules. The one or more QoS mapping rules may include a first mapping information for control plane data of the NPN session and second mapping information for user plane data of the NPN session.

For example, the WTRU may apply first QoS mapping information for mapping control plane data of the NPN session to packets of the PLMN session. The WTRU may apply second QoS mapping information for mapping user plane data of the NPN session to packets of the PLMN session. The first and second mapping information may be different. For example, the first QoS mapping information may indicate that the WTRU should apply a default or predetermined QoS value to PLMN packets carrying NPN control plane data. The second QoS mapping information may indicate that the WTRU should apply a set of configured mapping rules for mapping QoS values associated with the NPN session to respective QoS values of the PLMN session for packets carrying NPN user plane data. For example, the set of configured mapping rules for mapping QoS values associated with the NPN session to respective QoS values of the PLMN session may indicate which of a plurality of available PLMN QoS values should be used for each of a plurality of NPN QoS values that will be used for the NPN session. In this manner, differentiated QoS mapping/treatments may be applied to user plane data of the NPN session compared to control plane data of the NPN session when transmitting the NPN data via the PLMN. A QoS value may include a value for a QoS flow indicators (QFI).

A WTRU may send a request to a first network to establish a first session with the first network for transmission of data associated with a second network. The WTRU may send, via the request, an indication indicating that the first session is for the transmission of the data including the control plane data and the user plane data associated with the second network. The request may be sent to a session management function of the first network. The request may include a session request message.

The WTRU may receive one or more QoS mapping rules. The one or more QoS mapping rules may be received via a session establishment message. The one or more QoS mapping rules may include first mapping information for the control plane data associated with the second network and the second mapping information for the user plane data associated with the second network. The WTRU may use the first mapping information to assign the first QoS indication for a first packet for transmission in the first network. The first packet may include the control plane data associated with the second network. The WTRU may use the second mapping information to assign the second QoS indication for a second packet for transmission in the first network. The second packet of the first session may include the user plane data associated with the second network. The WTRU may send the first packet using the first QoS indication and the second packet using the second QoS indication, via a first session of the first network. The first session of the first network may be a user plane session. In certain examples, the user plane data may be packetized in a second session associated with the second network. The second session may be a protocol data unit (PDU) session.

The first QoS mapping information may include a predetermined QoS indication to be applied to a packet comprising control plane data associated with the second network. The second QoS mapping information may include individual mapping rules for mapping QoS indications for the second session of the second network to QoS indications for the first session of the first network. In certain examples, the second QoS mapping information may include a predetermined QoS indication to be applied to a packet comprising user plane data associated with the second network.

The one or more QoS mapping rules may include a default QoS indication to be applied to a packet comprising control plane data associated with the second network.

In certain examples, the first network may be NPN, and the second network may be PLMN.

DETAILED DESCRIPTIONS

A detailed description of illustrative embodiments will now be described with reference to the various Figures. Although this description provides a detailed example of possible implementations, it should be noted that the details are intended to be exemplary and in no way limit the scope of the application.

Figure 1A:
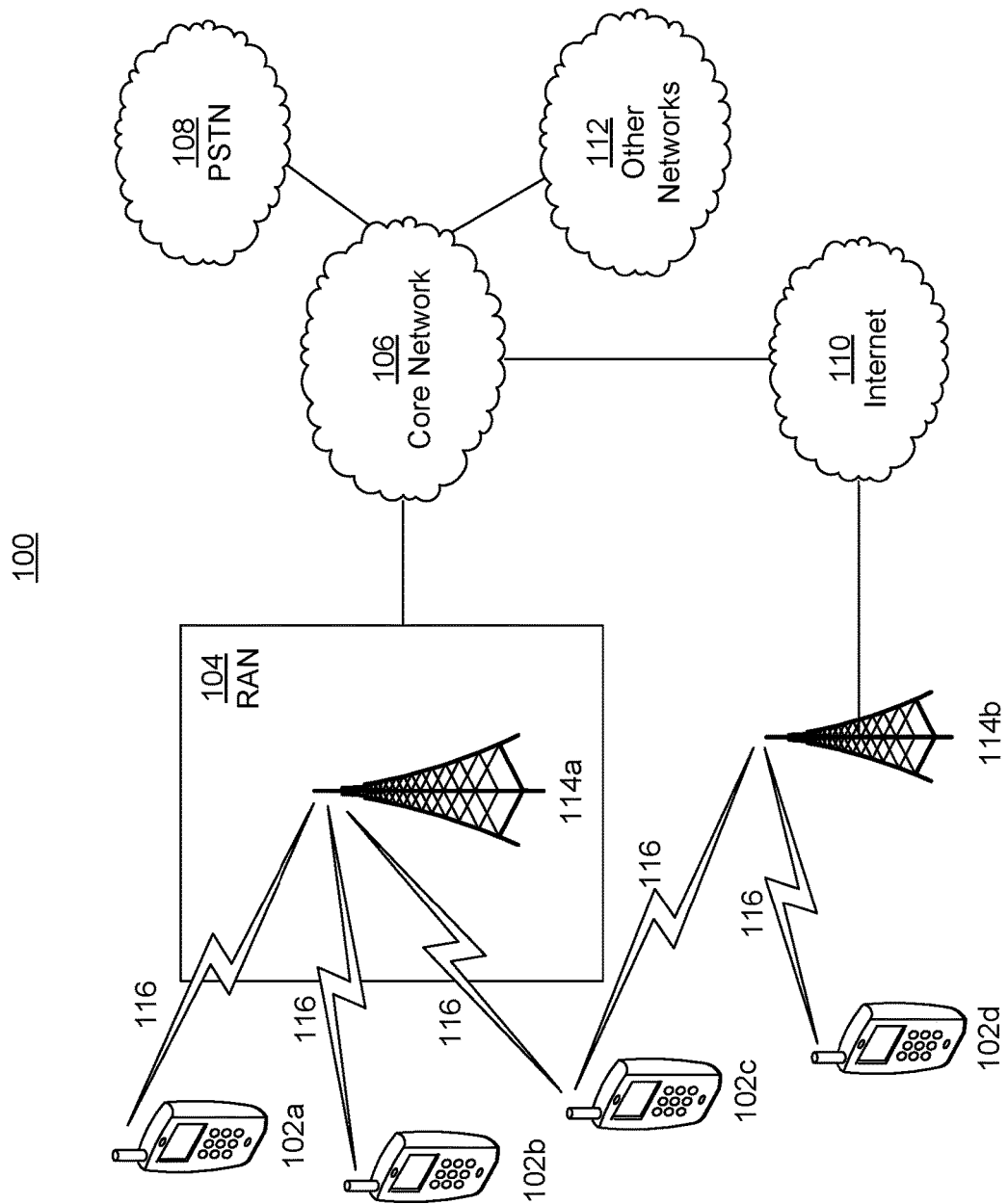
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
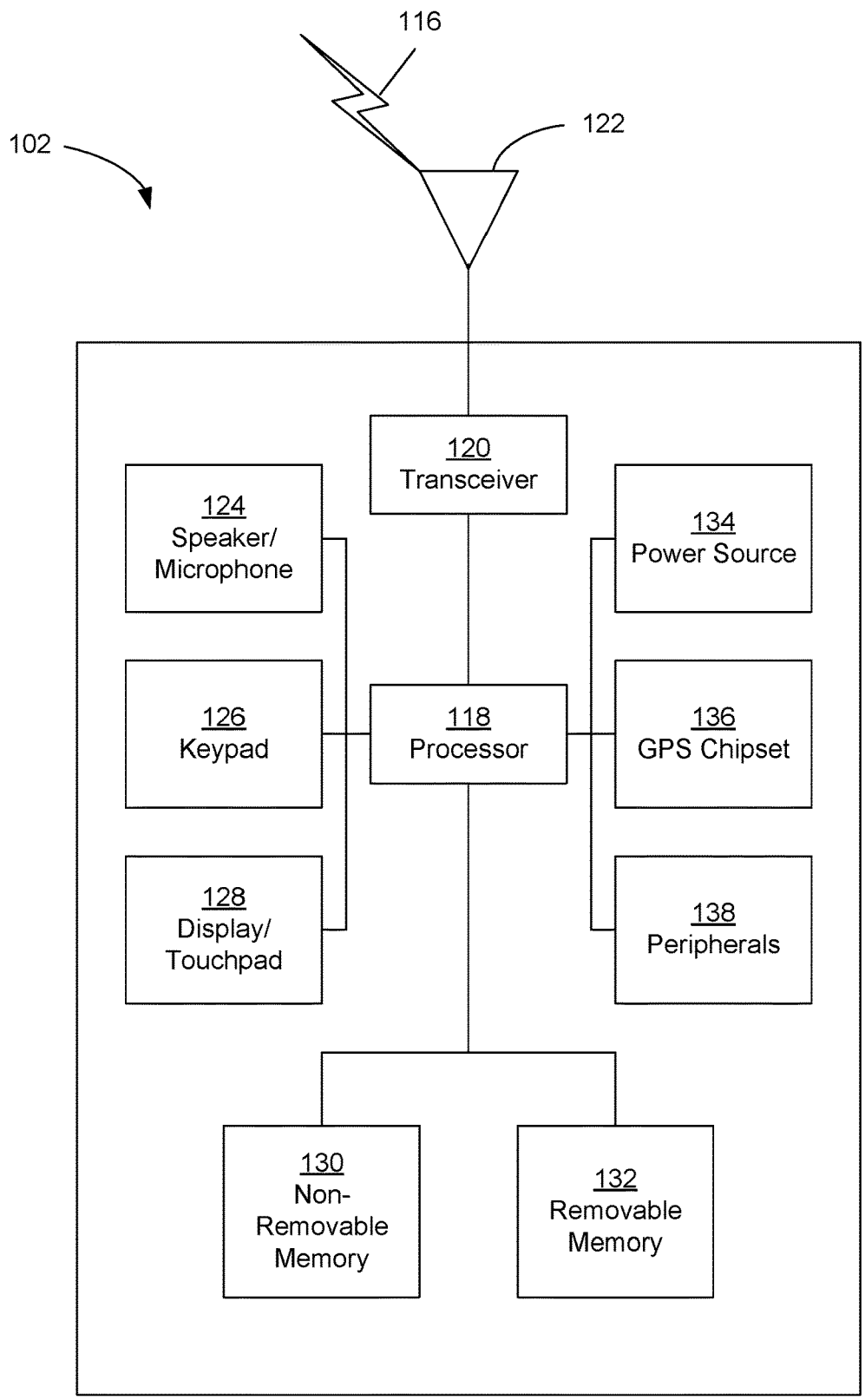
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
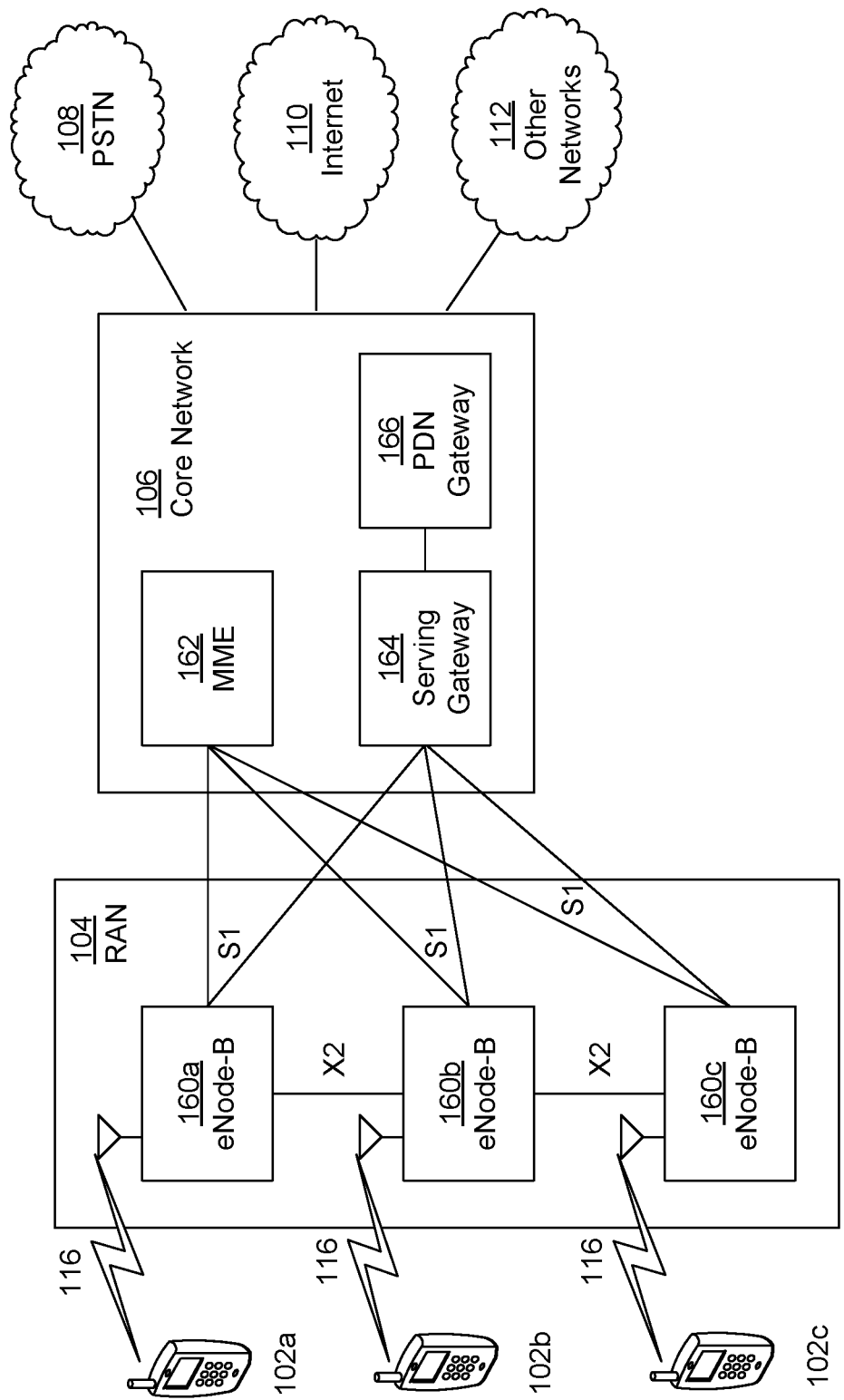
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
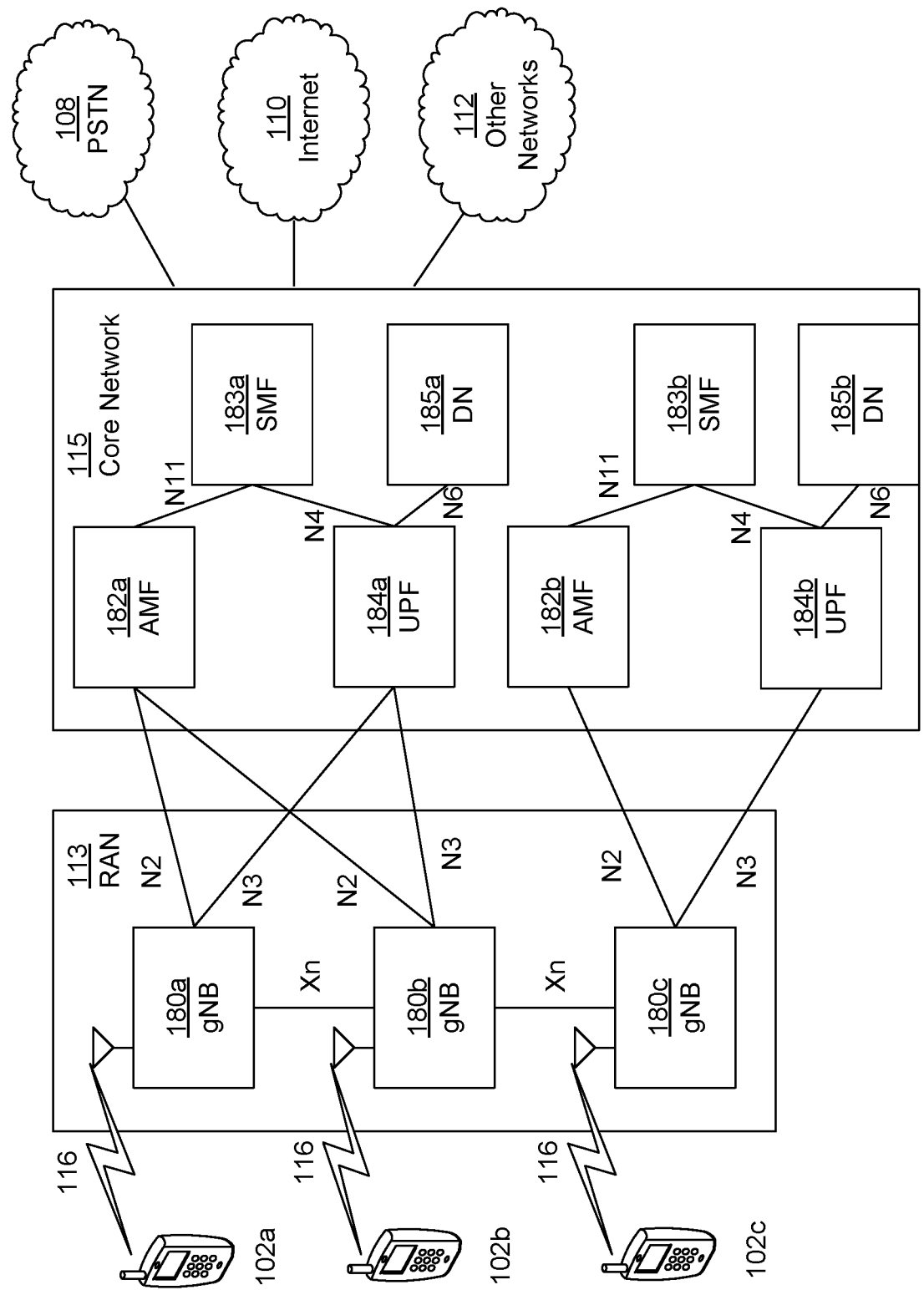
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
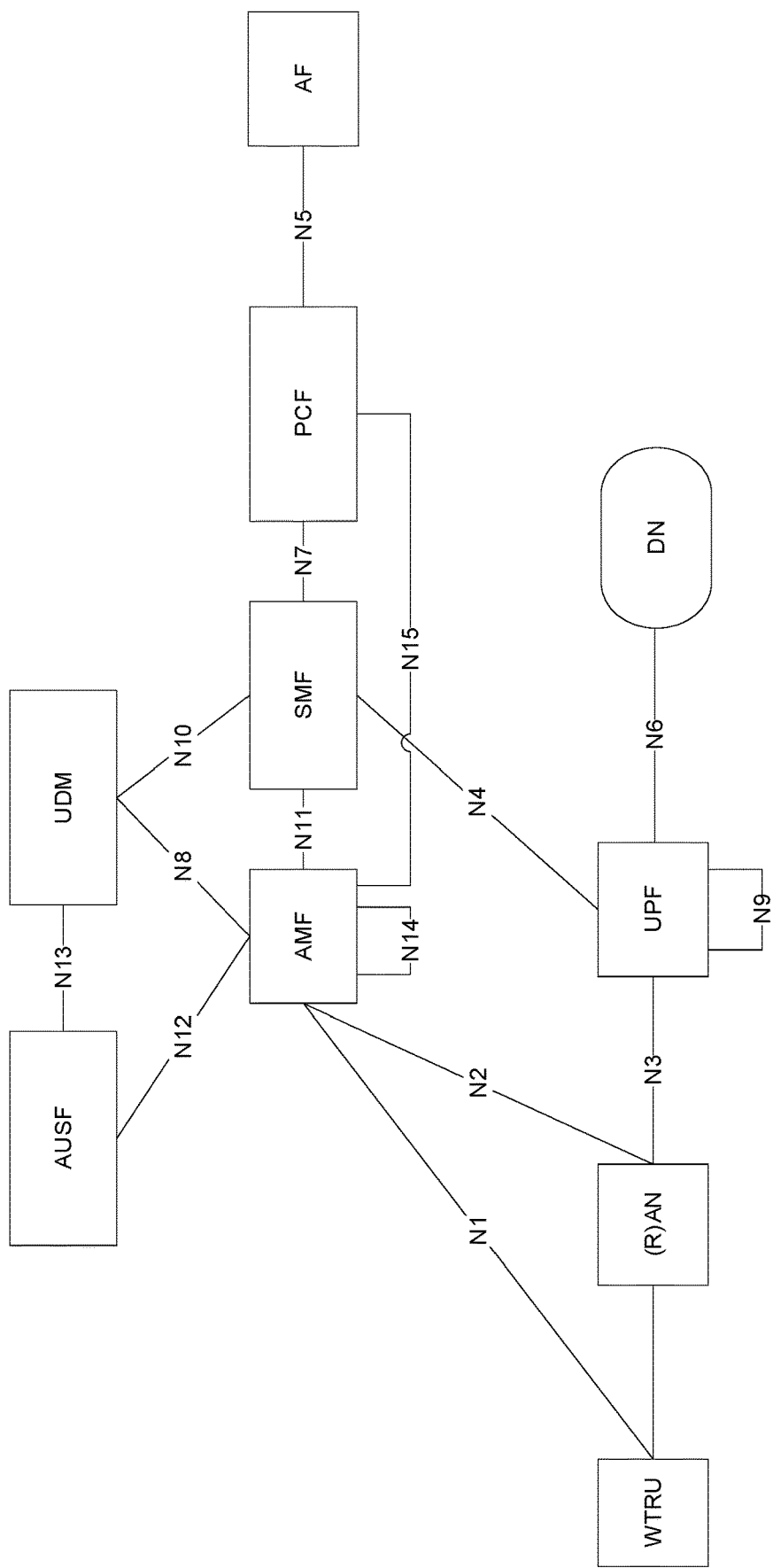
FIG. 2 illustrates an example reference model.

A reference model may be used for a network. FIG. 2 illustrates an example reference model. The example model may be used for a 5G and/or next generation (NextGen) network. As shown in FIG. 2, a radio access network (RAN) may refer to a radio access network based on the 5G radio access technology (RAT) and/or Evolved E-UTRA that may connect to the NextGen core network. The reference model as shown in FIG. 2 may include interactions among one or more of WTRU, radio access network (RAN), user plane function (UPF), data network (DN), authentication function (AUSF), unified data management (UDM), access control and mobility management function (AMF), session management function (SMF), policy control function (PCF), and application function (AF). An AMF may include one or more of the following functionalities: registration management, connection management, reachability management, mobility management, and/or the like. An SMF may include one or more of the following functionalities: session management (e.g., which may include session establishment and/or modify and release), WTRU internet protocol (IP) address allocation, selection and control of user plane (UP) function, and/or the like. A UPF may include one or more of the following functionalities: packet routing and forwarding, packet inspection, traffic usage reporting, and/or the like.

Figure 3:
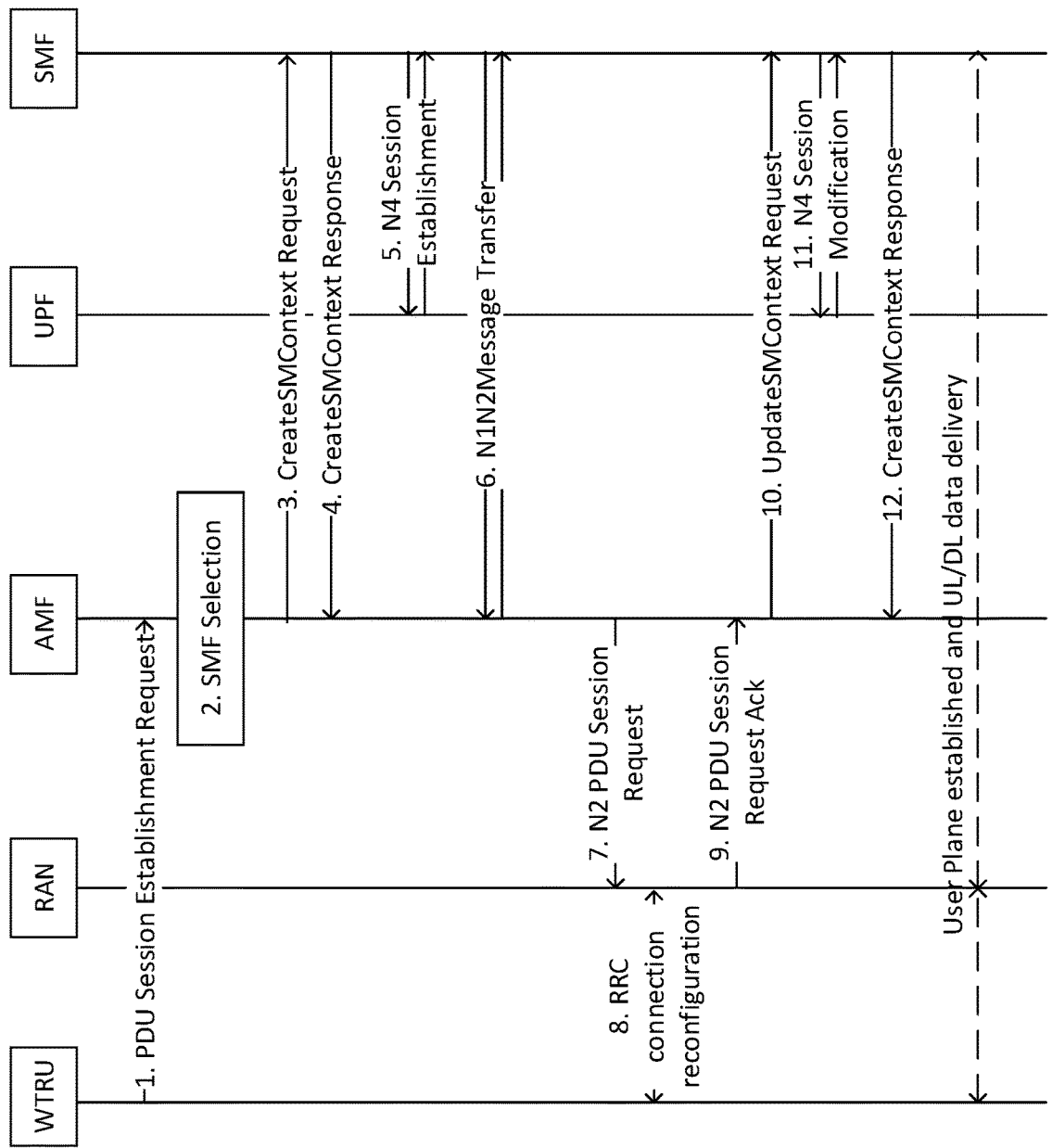
FIG. 3 illustrates an example of WTRU-requested PDU session establishment procedure.

For data delivery in a network (e.g., a 5G network), a protocol data unit (PDU) session may be established. The PDU session may be established after the registration procedure. As an example, a PLMN session may be a PDU session (PLMN PDU session). FIG. 3 illustrates an example of WTRU-requested PDU session establishment procedure. At 1, a WTRU may send a PDU session establishment request to an AMF. At 2, SMF selection may be performed. At 3, an AMF may send a createSMContextRequest to an SMF. At 4, the SMF may send a createSMContextResponse to the AMF. At 5, N4 session may be established between a UPF and the SMF. At 6, N1N2 message transfer may be performed (between AMF and SMF). At 7, N2 PDU session request may be sent from the AMF to RAN. At 8, RRC connection reconfiguration may be performed. At 9, the RAN may send N2 PDU session request acknowledgment the AMF. At 10, the AMF may send an updateSMContextRequest to the SMF. At 11, N4 session modification may be performed (between an UPF and the SMF). At 12, the SMF may send a createSMContextResponse to the AMF. The numbers shown in FIG. 3 may be presented for the purpose of reference. As such, the numbered actions may be performed in a different order (e.g., in whole or in part) and/or may be skipped.

After the procedure (e.g., registration procedure shown in FIG. 3), a user plane may be established. The WTRU, RAN, and/or SMF may keep related PDU session context. With the PDU session, the WTRU may communicate with DN.

Non-public network (NPN) communication may be established (e.g., via non-3GPP inter-working function (N3IWF)).

NPN may be a network that is intended for non-public use (e.g., factory, enterprise, and/or the like). NPN may be a 5G network. A WTRU may register to an NPN to use service provided by the NPN. The WTRU may register to a public land mobile network (PLMN) to use service provided by the PLMN.

A WTRU that is under coverage of a first network (e.g., a PLMN) may access a second network (e.g., an NPN). For example, a WTRU may establish a session with a first network for transmission of data associated with a second network.

Figure 4:
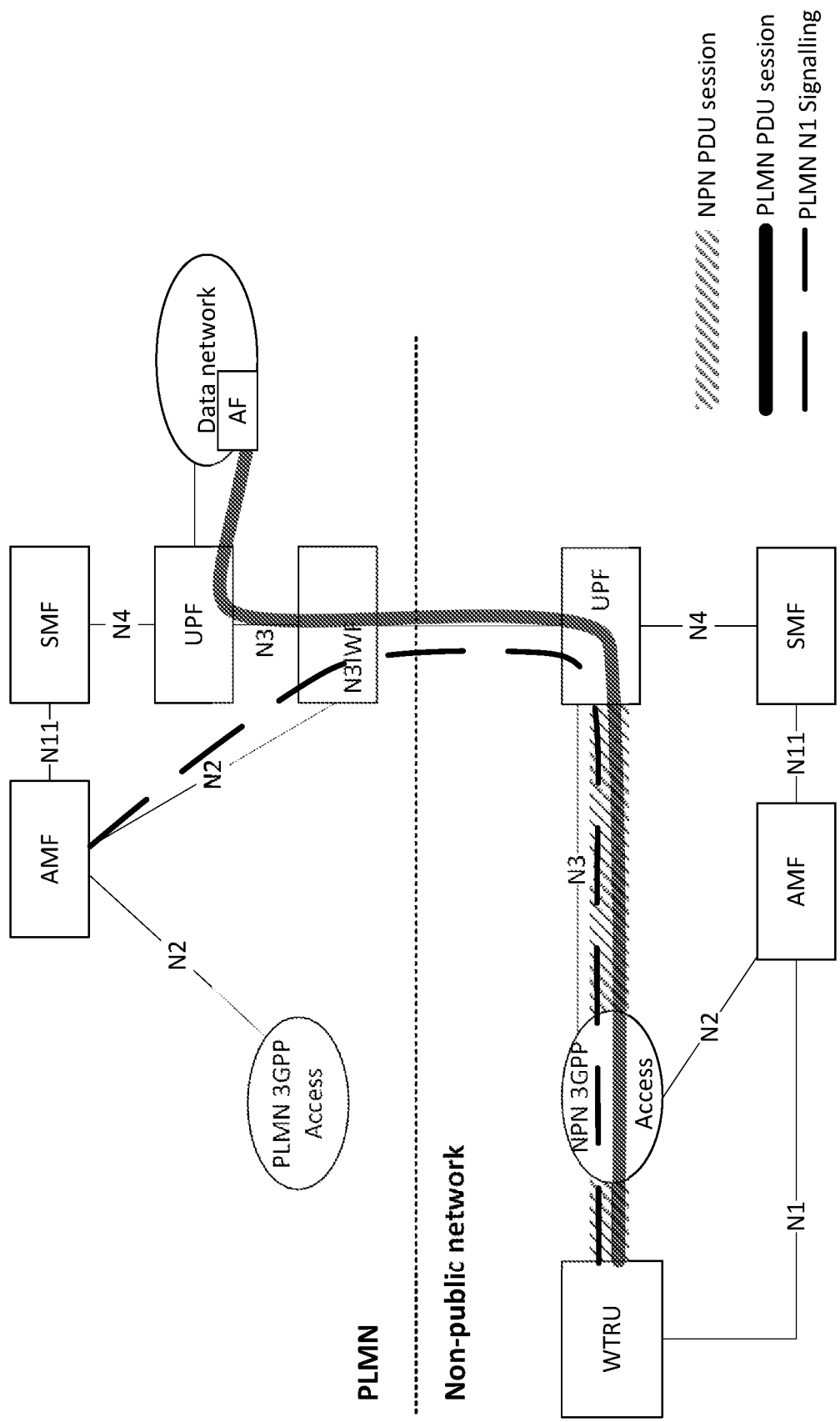
FIG. 4 illustrates an example where a WTRU accesses a PLMN service via an NPN.

A WTRU may be under coverage of an NPN (e.g., using 3GPP). FIG. 4 illustrates an example where a WTRU accesses a PLMN service via an NPN. If a WTRU is under coverage of an NPN and the WTRU is to use a PLMN service, the WTRU may register to the NPN and/or may establish an NPN session.

The examples described herein may be applicable to traffic or data. For example, although certain examples may be described in terms of traffic, the examples may be equally applicable to data. Thus, in a sense, these terms may be interchangeably used, and examples described in terms of traffic may be equally applicable to data.

As shown in FIG. 4, the WTRU may use the NPN session to transmit control plane data (e.g., PLMN registration signaling) to N3IWF in a PLMN. The NPN session may be a PDU session. The N3IWF may forward the registration of WTRU signaling to the AMF in the PLMN. The WTRU may establish a PLMN session to use the PLMN service, for example, after registration to the PLMN. The PLMN session may be a PDU session.

Figure 5:
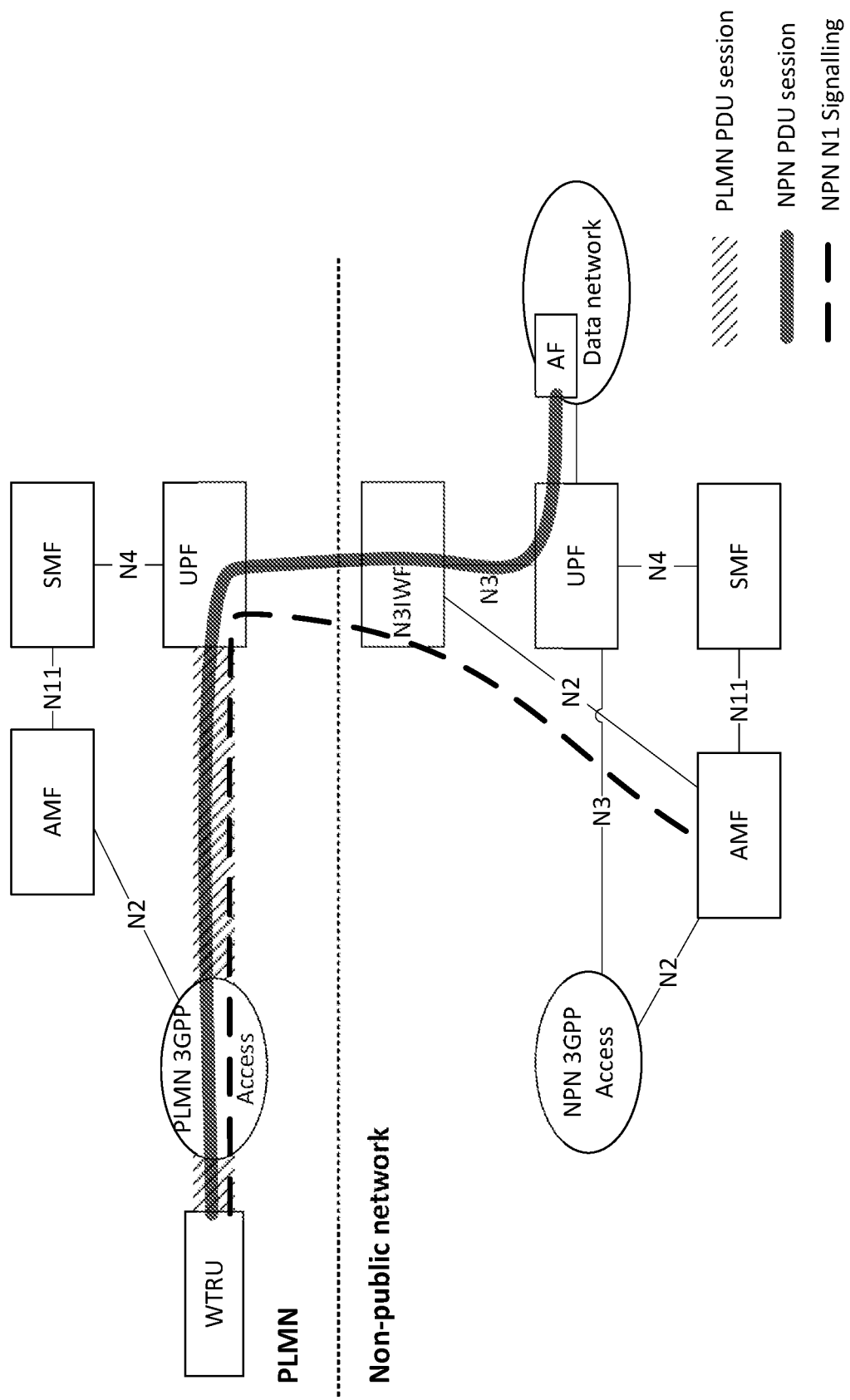
FIG. 5 illustrates an example where a WTRU accesses an NPN service via a PLMN.

A WTRU may be under coverage of an PLMN (e.g., using 3GPP). FIG. 5 illustrates an example where a WTRU accesses an NPN service via a PLMN. If a WTRU is under coverage of a PLMN and the WTRU is to use an NPN service, the WTRU may register to the PLMN and/or may establish a PLMN session. The PLMN session may be a PDU session.

User plane data may be associated with a session of a second network. User plane data may include data that is forwarded via a user plane. A user plane may include functions and/or processes that carry and/or forward network user traffic. In some examples, a user plane may also be referred to as data plane. For example, the user plane data may be part of a service/application in the second network. The WTRU may establish a session to use the service/application in the second network.

Control plane data may include information for setting up and/or configuring the user plane data associated with the session of the second network. A control plane may be used to carry signaling traffic. A control plane may include functions and/or processes that manage and/or configure the user plane data. The control plane data may be associated with the second network, for example, due to its usage in setting up the user plane data in the session of the second network. As shown in FIG. 5, if the WTRU is under coverage of the PLMN and the WTRU is to use the NPN service, the WTRU may use the PLMN session to transmit NPN control plane data (e.g., registration signaling) to N3IWF in the NPN. As shown in FIG. 5, the N3IWF may forward the registration signaling to the AMF in the NPN. The WTRU may establish an NPN session to use the NPN service, for example, after registration to the NPN. The NPN session may be a PDU session.

Figure 6:
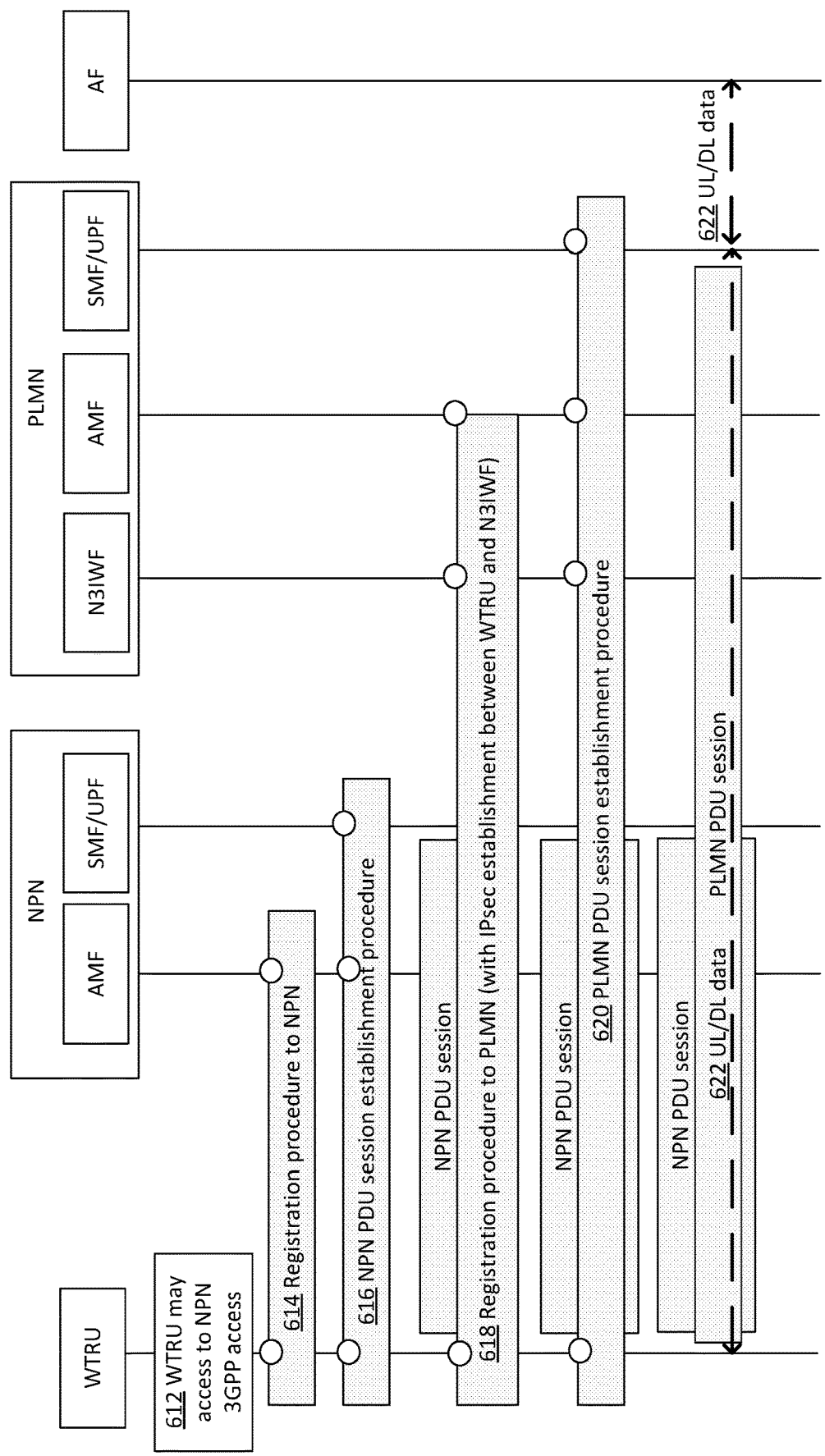
FIG. 6 illustrates an example for a WTRU accessing a PLMN service via an NPN.

FIG. 6 illustrates an example for a WTRU accessing a PLMN service via an NPN. The example in FIG. 6 may be a call flow. The example call flow in FIG. 6 may be associated with the example shown in FIG. 4. The example for a WTRU accessing a PLMN service via a NPN as illustrated in FIG. 6 may include one or more of the followings. A WTRU at 612 may have access to an NPN (e.g., a NPN 3GPP access). At 614, the WTRU may register to the NPN. For example, the WTRU may perform a registration procedure to the NPN. In the example shown in FIG. 6, the registration may be via an AMF.

At 616, the WTRU may establish an NPN PDU session. If the registration procedure to the NPN is successful, the WTRU may trigger a session establishment procedure to establish an NPN PDU session. The procedure may include an NPN PDU session establishment procedure. After the PDU session establishment procedure, the user plane may be established between the WTRU and UPF in the NPN. The WTRU may obtain an IP address from the NPN. In the example shown in FIG. 6, the session establishment may be via an AMF of NPN and/or SMF/UPF of NPN.

At 618, the WTRU may perform registration procedure with a PLMN. The WTRU may use the IP address allocated from the NPN PDU session (e.g., as shown in 616 of FIG. 6) to contact a PLMN N3IWF to perform registration procedure with a PLMN. IPsec may be established between the WTRU and N3IWF of PLMN. In the example shown in FIG. 6, the registration procedure may be via, among other functions, AMF of PLMN.

A 620, if the registration procedure with the PLMN is successful, the WTRU may trigger a session establishment procedure to establish a PLMN PDU session. The procedure may include an PLMN PDU session establishment procedure. After the PDU session establishment procedure, a user plane may established between the WTRU and user plane function (UPF) in the PLMN. The WTRU may obtain an IP address from the PLMN. In the example shown in FIG. 6, the session establishment may be via one or more of PLMN N3IWF, PLMN AMF and/or PLMN SMF/UPF.

At 622, if the WTRU accesses the PLMN service, the WTRU may use the IP address allocated by the PLMN to construct an IP packet (e.g., an original IP packet). The WTRU may encapsulate the constructed IP packet into a IPsec tunnel. The IPsec tunnel may use the IP address allocated by the NPN as a source address of an external IP header. The N3IWF may remove the external IP header, e.g., from IPsec tunnel, and/or may forward the IPsec tunnel to UPF and/or to application function (AF). The AF may receive the IP packets with the IP address of the WTRU allocated by the PLMN. In certain examples, 612-622 as shown in FIG. 6 may be performed in a different order (e.g., in whole or in part), may be skipped, and/or may be replaced with different actions.

A network may subscribe to a WTRU's reachability status. A WTRU may indicate reachability status to the network.

A WTRU may utilize one or more power saving features to reduce power consumption, for example, in 5G system. For example, power saving features may include one or more of mobile initiated connection only (MICO) mode, longer discontinuous reception (DRX), and/or the like. AF may communicate with a WTRU that utilizes one or more power saving features. The AF may subscribe to a WTRU reachability status from a network (e.g., a 5G network). For example, if a WTRU activates an MICO mode, an AF may send DL data to the WTRU when the WTRU is reachable. The AF may not send the data during periods of unreachability.

If a WTRU accesses a PLMN service via a NPN (e.g., as illustrated in the example shown in FIG. 4), one or more of power saving features may be activated in the NPN. For example, the WTRU may negotiate MICO mode activation with AMF in the NPN during the NPN registration. The MICO mode activation may be transparent for a PLMN.

AF may not be indicated that the WTRU is in an MICO mode. If the AF (e.g., which may provide a PLMN service) subscribes to the WTRU status from the PLMN, the PLMN may not report to the AF that the WTRU is in the MICO mode. If the AF subscribes to the WTRU status from the PLMN and the PLMN does not report the AF that the WTRU is in the MICO mode, the AF may continue to send DL data. NPN may discard the DL data. The WTRU may not receive DL data in MICO mode.

If a WTRU accesses an NPN service via a PLMN (e.g., as illustrated in the example shown in FIG. 5), one or more of power saving features may be activated in the PLMN. If the AF (e.g., which may provide a NPN service) subscribes to the WTRU status from the NPN, the NPN may not report to the AF that the WTRU is in the MICO mode. If the AF subscribes to the WTRU status from the NPN and the NPN does not report the AF that the WTRU is in the MICO mode, the AF may continue to send DL data. PLMN may discard the DL data.

One or more services may be continued during a WTRU mobility. For example, service continuity may be maintained for one or more PDU sessions. In an example, if a WTRU moves from a PLMN 3GPP access to an NPN 3GPP access, the WTRU may perform one or more of the following (e.g., shown in FIG. 7) to keep PLMN service continuity.

Figure 7:
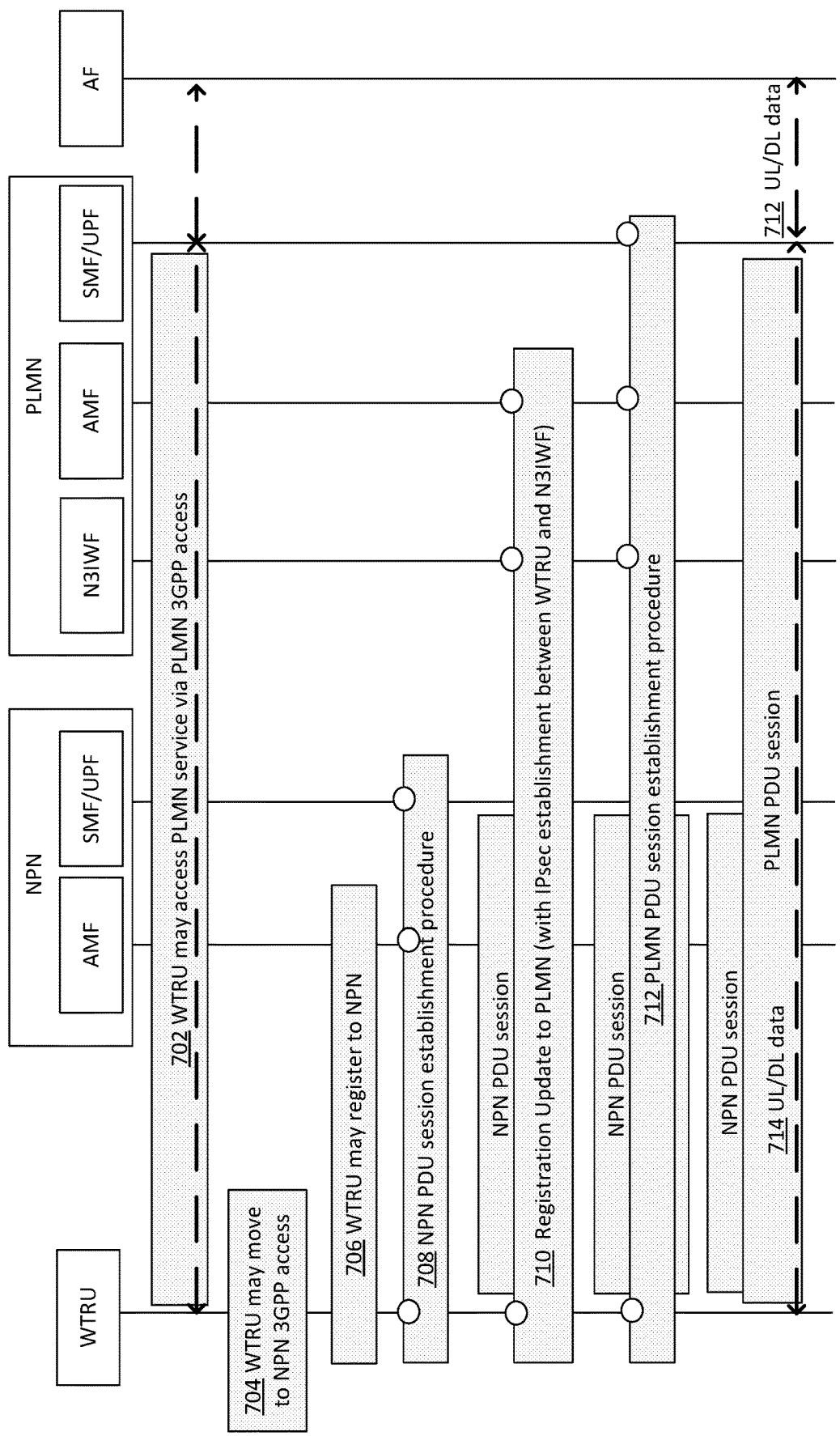
FIG. 7 illustrates an example WTRU mobility from a PLMN 3GPP access to an NPN 3GPP access for access to a PLMN service.

FIG. 7 illustrates an example WTRU mobility from a PLMN 3GPP access to an NPN 3GPP access for access to a PLMN service. At 702, the WTRU may access a PLMN service via PLMN 3GPP access. At 704, the WTRU may move to an NPN 3GPP access. At 706, the WTRU may register to the NPN. At 708, the WTRU may perform NPN session establishment procedure, for example, in connection with one or more of NPN AMF and/or NPN SMF/UPF. At 710, the WTRU may send registration update to the PLMN (e.g., with IPsec establishment between WTRU and N3IWF). At 712, the WTRU may perform a PLMN PDU session establishment procedure, for example, in connection with one or more of PLMN N3IWF, PLMN AMF, and/or PLMN SMF/UPF. At 714, a PLMN PDU session may be established.

After one or more (e.g., two) registration update procedures (e.g., 706 and 710 shown in FIG. 7) and/or one or more (e.g., two) PDU session establishment procedures (e.g., 708 and 712 shown in FIG. 7), the WTRU may be able to communicate with the AF. The mobility procedure described herein may introduce an interruption (e.g., a long time interruption) for an ongoing service with the AF (e.g., 710 shown in FIG. 7). The application layer may tear down the service, for example, due to long no response time from the WTRU. In certain examples, 702-714 as shown in FIG. 7 may be performed in a different order (e.g., in whole or in part), may be skipped, and/or may be replaced with different actions.

QoS flow may be managed by a network and/or a WTRU.

In the example shown in FIG. 5, NPN PDU sessions and QoS flows may be carried by a PLMN PDU session. The PLMN PDU session may provide the IP connectivity between a WTRU (e.g., a WTRU in PLMN) and an N3IWF in an NPN.

Figure 8:
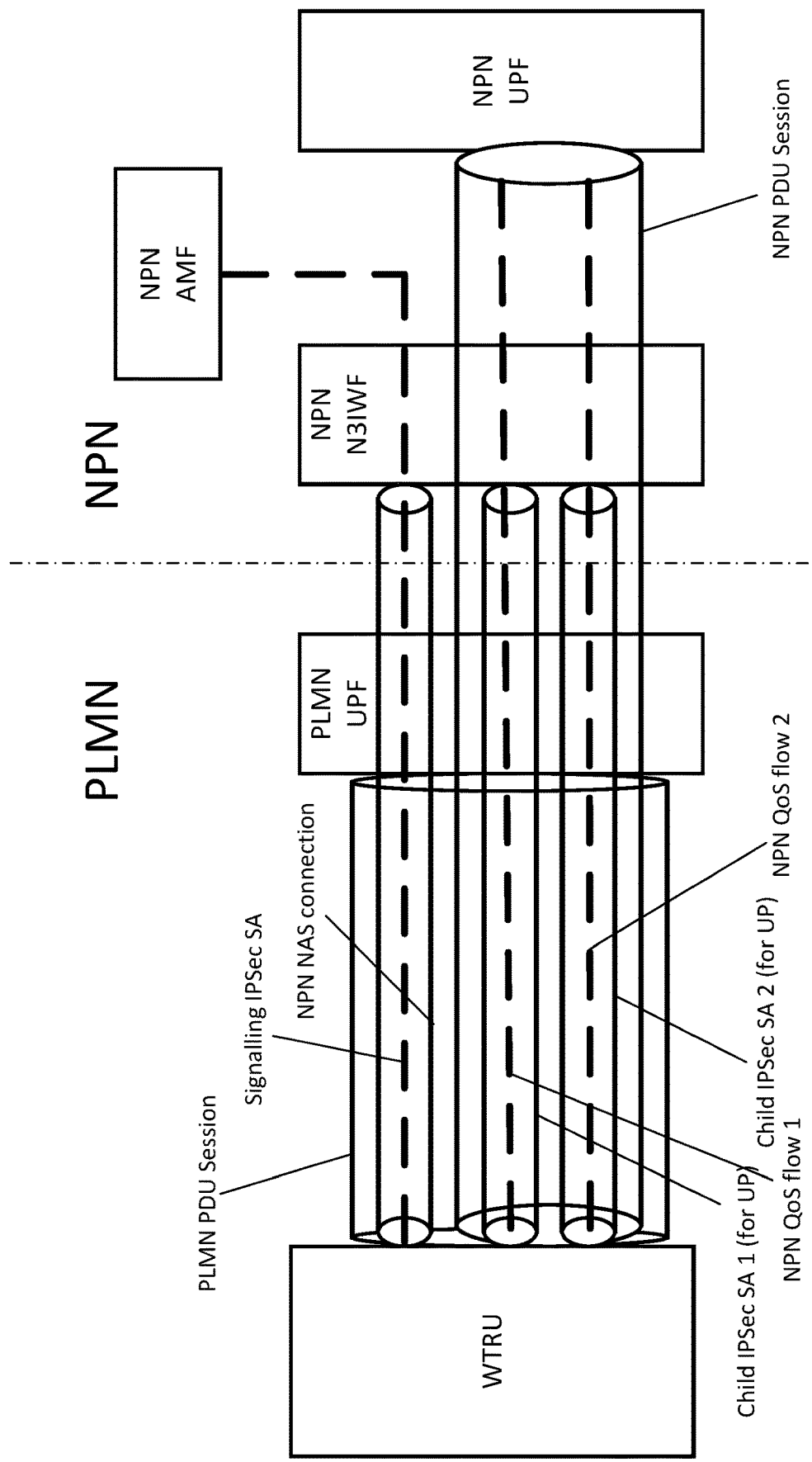
FIG. 8 illustrates an example QoS flow relationship.

FIG. 8 illustrates an example QoS flow relationship. The example in FIG. 8 may illustrate the QoS flow relationship between an NPN QoS flow and a PLMN carrier PDU session.

The NPN QoS flows may be mapped to one or more child IPSec security associations (SAs). The IPSec SAs may be mapped to one or more QoS flows of the PLMN PDU Session, as illustrated in FIG. 8. In some examples, the IPSec SAs may be used as tunnels.

Signaling IPSec SA between the WTRU and the NPN N3IWF may be carried by the QoS flow of the PLMN PDU session. As shown in FIG. 8, the PLMN PDU session may be for control plane signaling intended for the NPN. As shown in FIG. 8, the PLMN PDU session may be for user plane data intended for the NPN.

In FIG. 8, an NPN NAS connection and an NPN PDU session may be established between a WTRU and an NPN UPF. The NPN NAS signaling may be transmitted via a signaling IPSec SA between the WTRU and the N3IWF. The NPN PDU session data may be transmitted via one or more (e.g., two) child IPSec SAs between the WTRU and the N3IWF. For example, a child IPSecSA may accommodate an NPN QoS flow. Within the PLMN, the NPN NAS signaling and/or NPN PDU session may be carried by QoS flows of a PLMN PDU session (e.g., PLMN carrier PDU session). In some examples, the PLMN QoS flows may be within the PDU session.

A WTRU and/or a network may map the NPN NAS signaling to corresponding QoS flows in the PLMN PDU session. A WTRU and/or a network may map UP QoS flows (e.g., the UP QoS flows that are transmitted via IPSec SAs) to corresponding QoS flows in the PLMN PDU session.

The example QoS flow relationship illustrated in FIG. 8 may be applicable to the example shown in FIG. 5. The example QoS flow relationship illustrated in FIG. 8 may be applicable to the example shown in FIG. 4 with the role of a PLMN and an NPN switched.

One or more procedures described herein may be based on the example described in FIG. 5. One of ordinary skill in the art will appreciate that one or more procedures described herein may be based on examples described in FIG. 4. In the example described in FIG. 4, the role of a PLMN and a NPN may switch.

A WTRU status may be indicated to a network if a network is subscribed to the WTRU.

If a WTRU accesses a second network via a first network, the WTRU may provide a WTRU ID that is used in the first network to the second network, for example, during the registration to the second network. In examples, the first network may be an NPN and the second network may be a PLMN. If a WTRU accesses a PLMN via an NPN, the WTRU may provide a WTRU ID used in the NPN to the PLMN (e.g., during the registration procedure to the PLMN). If the second network receives the WTRU ID that is used in the first network in the registration request message, the second network may be indicated that the WTRU is registered to the first network. In an example, if the PLMN receives the NPN WTRU ID in the registration request message, the PLMN may learn that the WTRU is registered to the NPN. The second network may subscribe to reachability of the WTRU from the first network based on the received WTRU ID. The second network may provide the WTRU ID to the AF. In an example, the PLMN may subscribe to reachability of the WTRU from the NPN based on the received WTRU ID. The PLMN may provide the WTRU ID to the AF for AF subscribing to the reachability of the WTRU from the NPN.

In certain examples, the first network may be a PLMN and the second network may be an NPN. If a WTRU access an NPN via a PLMN, the WTRU may provide a WTRU ID used in the PLMN to the NPN during the registration procedure to the NPN. The NPN may subscribe to reachability of the WTRU from the PLMN based on the WTRU ID. The NPN may provide the WTRU ID to the AF for AF subscribing to the reachability of the WTRU from the PLMN.

The WTRU may perform one or more of the following: the WTRU may retrieve a WTRU ID used for the first network; the WTRU may provide the WTRU ID used for the first network to the second network; and/or the like.

In examples, the WTRU may retrieve a WTRU ID used for the first network. The first network may be a PLMN if the WTRU accesses an NPN service via the PLMN. The first network may be the NPN if the WTRU accesses the PLMN service via the NPN. The WTRU ID may correspond to a permanent ID, (e.g., one or more of a subscription permanent identifier (SUPI)). The WTRU ID may correspond to a temporary ID (e.g., a globally unique temporary identifier (GUTI)).

In examples, the WTRU may provide the WTRU ID used for the first network to the second network, for example, during the registration procedure. The second network may be an NPN if the WTRU accesses the NPN service via the PLMN. The second network may be the PLMN if the WTRU accesses the PLMN service via the NPN. The WTRU may provide the first network ID, for example, during the registration procedure.

The AMF may perform one or more of the following: the AMF may keep the mapping between the WTRU ID used for the first network and the WTRU ID used for a second network; the AMF may provide the mapping to a network exposure function (NEF) and/or application function; the AMF may retrieve the related WTRU ID used for a first registered network; the WTRU may subscribe to the event from the first registered network according to the WTRU ID used for the first registered network; and/or the like.

In examples, if the AMF receives a WTRU ID used for a first network, the AMF may keep the mapping between the WTRU ID that is used for the first network and the WTRU ID that is used for a second network.

In examples, if the AMF receives an event subscription for a WTRU ID used for a second registered network, the AMF may retrieve the related WTRU ID used for a first registered network and may subscribe to the event from the first registered network according to the WTRU ID used for the first registered network.

Figure 9:
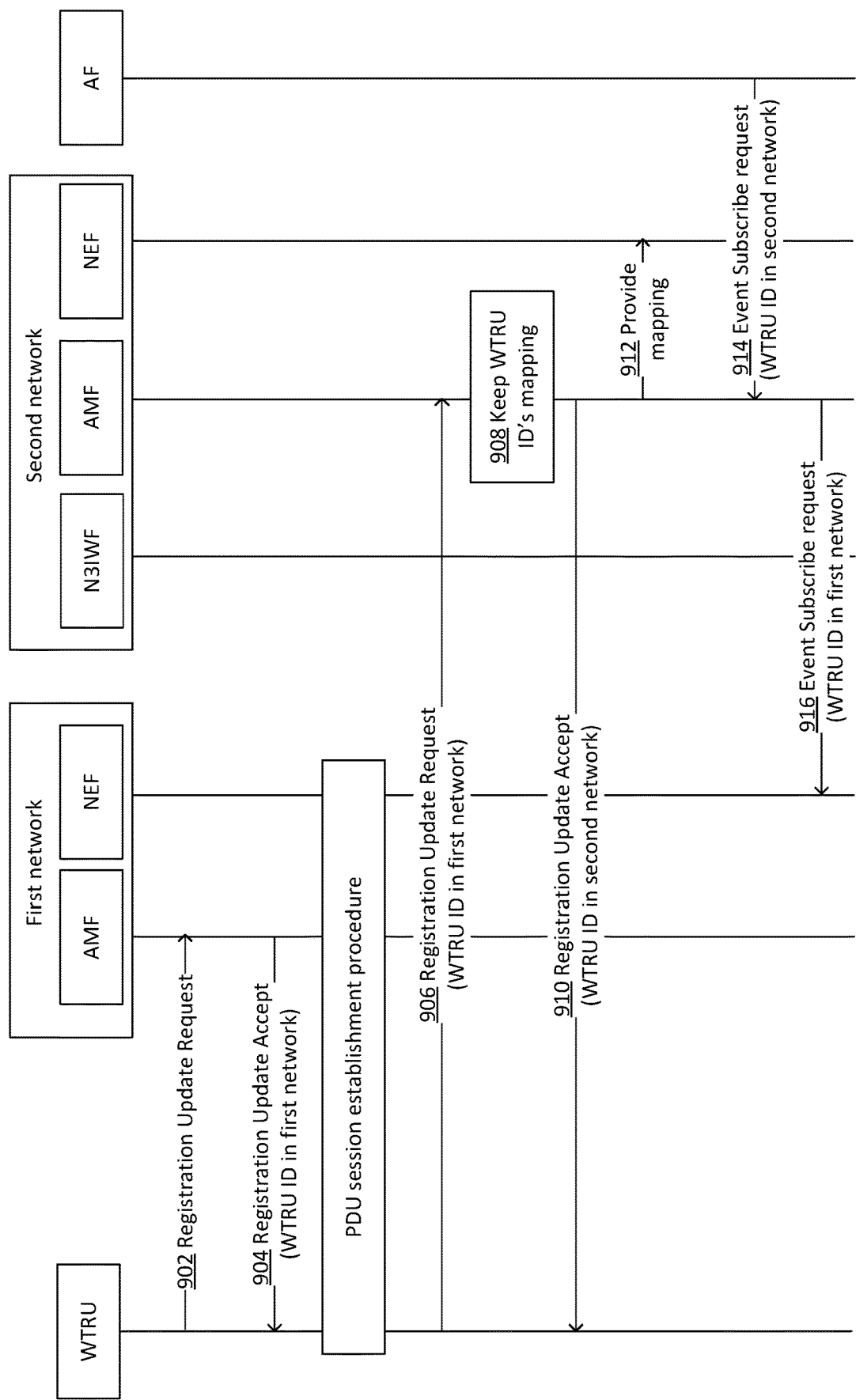
FIG. 9 illustrates an example where a WTRU registers to a second network via a first network.

FIG. 9 illustrates an example where a WTRU registers to a second network via a first network.

At 902, a WTRU may send a request to the first network. The request may include a registration update request. The request may be sent to AMF of the first network.

At 904, the WTRU may receive an indication of acceptance from the first network. The indication may include an indication for a registration update accept. The indication may include a WTRU ID that is used in the first network (e.g., 5G-GUTI). The WTRU may receive the indication from the AMF of the first network. As shown in FIG. 9, a PDU session establishment procedure between the WTRU and the first network may be performed.

At 906, the WTRU may send a request to the second network. The request may include a registration update request. The request may be sent to a second network via the first network (e.g., user plan of PDU session in first network). The WTRU may send the request to the AMF of the second network. The WTRU may include the WTRU ID that is used in the first network, for example, in the request.

At 908, the second network (e.g., the AMF in the second network) may keep the mapping between the WTRU ID that is used in the first network and the WTRU ID that is used in the second network.

At 910, the WTRU may receive an indication of acceptance from the second network. The indication may include an indication for a registration update accept from the second network. The indication may include a WTRU ID that is used in the second network. The WTRU may receive the indication from the AMF of the second network. The AMF (e.g., the AMF of the second network as shown in FIG. 9) may accept the registration update request and/or may send the WTRU ID that is used in the second network to the WTRU.

At 912, the AMF of the second network may provide the mapping between the WTRU ID that is used in the first network and the WTRU ID that is used in the second network to the NEF of the second network.

At 914, the AF may subscribe the event of the WTRU, for example, via the NEF. The NEF may be in the second network. For example, AF may subscribe the reachability from the AMF. The AMF may be in the second network.

At 916, the AMF may subscribe to the WTRU event according the WTRU ID that is used in the first network.

In certain examples, 902-916 as shown in FIG. 9 may be performed in a different order (e.g., in whole or in part), may be skipped, and/or may be replaced with different actions. In examples, the NEF may subscribe to the WTRU event according the WTRU ID that is used in the first network, if the mapping between the WTRU ID in the first network and the WTRU ID in the second network has been provided by AMF (e.g., at 912 shown in FIG. 9.)

If a WTRU accesses a second network via a first network, the WTRU may provide parameters of power saving function used in the first network. In examples, the parameters of the power saving functions may include one or more of eDRX cycle, MICO indication, and/or the like. Based on the parameters, the AMF in the second network may decide the network parameters used in the second network. The network parameters used in the second network may include one or more of NAS re-transmission timer, inactivity timer, and/or the like.

The WTRU may perform one or more of the following: the WTRU may retrieve the parameters of power saving function used for the first network; the WTRU may provide the parameters of power saving function used for the first network to the second network; and/or the like. The parameters of power saving function may include one or more of eDRX cycle, MICO indication, and/or the like.

In examples, the WTRU may retrieve the parameters of power saving function used for the first network. The first network may be the PLMN if the WTRU accesses the NPN service via PLMN. The first network may be the NPN if the WTRU accesses the PLMN service via NPN.

In examples, the WTRU may provide the parameters of power saving function used for the first network to the second network during the registration procedure. The second network may be the NPN if the WTRU accesses the NPN service via PLMN. The second network may be the PLMN if the WTRU accesses the PLMN service via NPN.

The AMF may perform one or more of the following: the AMF may decide the network parameters used in the second network; the AMF may perform the NAS re-transmission; and/or the like. The network parameters used in the second network may include one or more of NAS re-transmission timer, inactivity timer, and/or the like.

In examples, if the AMF receives the parameters of power saving function used for the first network, the AMF may decide the network parameters used in the second network.

In examples, the AMF may perform the NAS re-transmission based on the network parameters. The AMF may perform WTRU activity check based on the network parameters.

Figure 10:
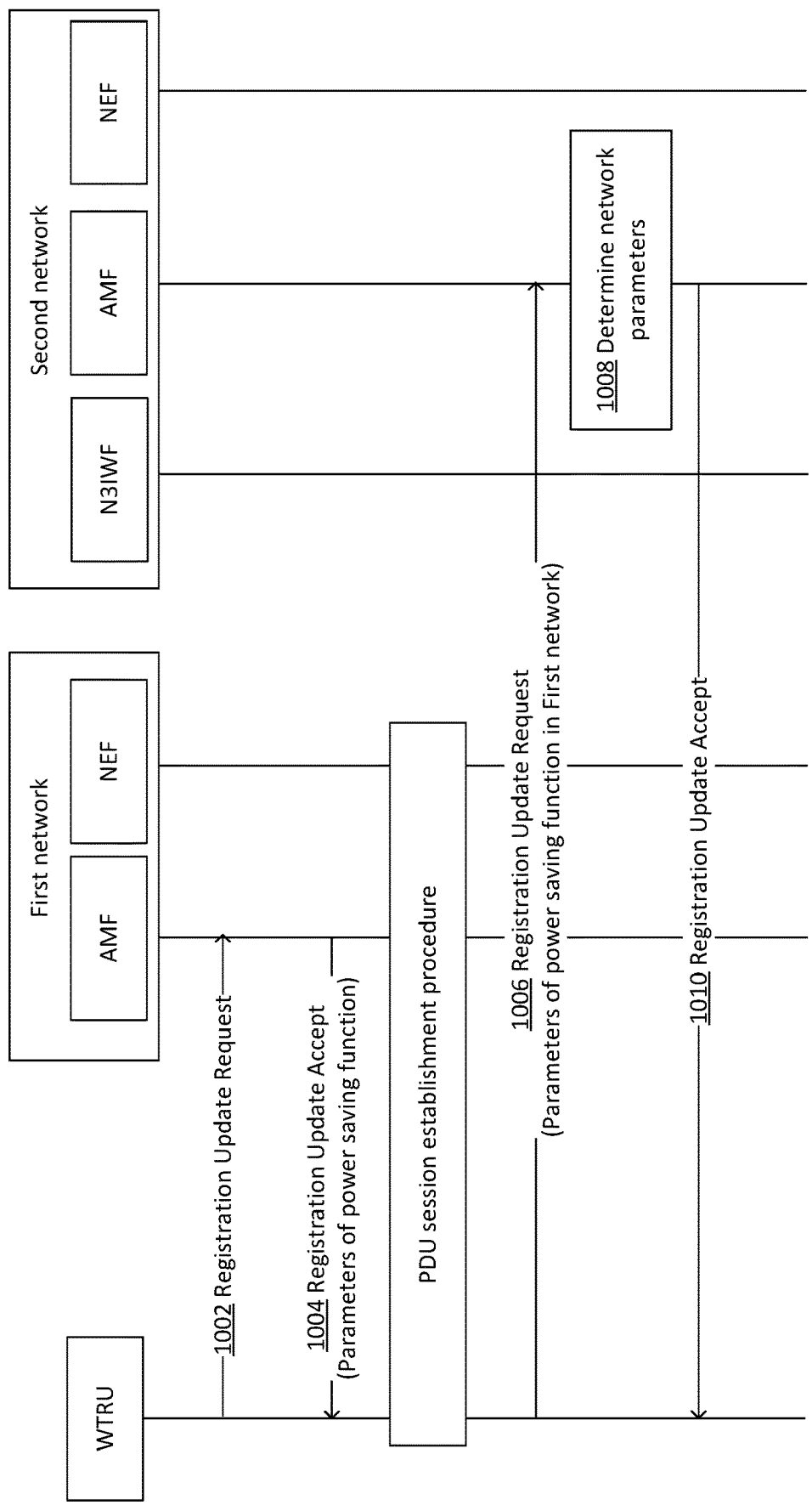
FIG. 10 illustrates an example where a WTRU is registered to a second network via a first network.

FIG. 10 illustrates an example where a WTRU is registered to a second network via a first network.

A registration of the WTRU to a second network via a first network illustrated in FIG. 10 may include one or more of the following.

At 1002, a WTRU may send a request to a first network. The request may include a registration update request.

At 1004, the WTRU may receive an indication for a registration update accept from the first network. The indication may be for a registration update accept. The indication for the registration update accept may include parameters of power saving function. As shown in FIG. 10, a PDU session establishment procedure between the WTRU and the first network may be performed.

At 1006, a WTRU may send a request to a second network via the first network. The request may include a registration update request. For example, the request may be sent via user plane of PDU session in the first network. The WTRU may include the parameters of power saving function that are used in the first network, for example, in the request.

At 1008, the second network (e.g., the AMF in the second network) may determine the network parameters based on the parameters of power saving function in the first network.

At 1010, the AMF in the second network may accept the request. The AMF may send an indication of registration update accept to the WTRU.

In certain examples, 1002-1010 as shown in FIG. 10 may be performed in a different order (e.g., in whole or in part), may be skipped, and/or may be replaced with different actions.

A WTRU may move between a first network and a second network. The WTRU may perform a registration update procedure to the second network via N3IWF for preparation to move to a first network.

A WTRU may move between an NPN and a PLMN. If the WTRU accesses a PLMN via the PLMN, the WTRU may perform a registration update procedure to PLMN via N3IWF for preparation to move to a NPN. The registration update procedure may be used for a WTRU to register to a network. The registration update procedure may be for an initial registration (e.g., an initial registration of a WTRU to a network). The registration update procedure may be for an update registration (e.g., an update registration of a WTRU to a network). The registration update procedure may allow the WTRU to complete a registration (e.g., initial registration). For example, a WTRU context may be established in a network. The registration update procedure may allow the WTRU to update a registration, for example, when the WTRU moves out of a tracking area.

In examples, the WTRU may move from the PLMN to the NPN. After the mobility from the PLMN to the NPN, the WTRU may perform PDU session establishment to the PLMN via N3IWF in the PLMN, instead of and/or in addition to performing a registration update procedure to the PLMN via N3IWF in the PLMN first. A WTRU may perform a registration procedure and may perform PDU session establishment. In examples, a WTRU may perform the registration procedure first. A WTRU may skip performing the registration procedure and may perform PDU session establishment. In examples, a WTRU may skip performing the registration procedure and may perform PDU session establishment after moving from the PLMN to the NPN.

If a WTRU accesses a second network via the second network, the WTRU may perform registration update procedure to the second network via N3IWF for preparation to move to a first network. As an example, if a WTRU accesses a NPN via the NPN, the WTRU may perform registration update procedure to the NPN via N3IWF for preparation to move to a PLMN. In some examples, the WTRU may access the second network directly. For example, the WTRU may access the NPN directly by contacting AMF without involving N3IWF.

In examples, the WTRU may move from the NPN to the PLMN. After the mobility from the NPN to the PLMN, the WTRU may perform the PDU session establishment to the NPN via the N3IWF in the NPN, instead of and/or in addition to performing the registration update procedure to the NPN via N3IWF in the NPN first.

The WTRU behavior may include one or more of the followings. The WTRU may determine to perform PLMN registration (e.g., via N3IWF) when the WTRU registered to the PLMN via PLMN 3GPP access. The WTRU may discover the N3IWF of the PLMN and/or may trigger the registration update procedure via a PLMN PDU session. The WTRU may move to the NPN. After the WTRU moves to NPN, the WTRU may perform PLMN PDU session establishment procedure via N3IWF in the PLMN if the WTRU has registered to the PLMN via N3IWF before the mobility.

Figure 11A:
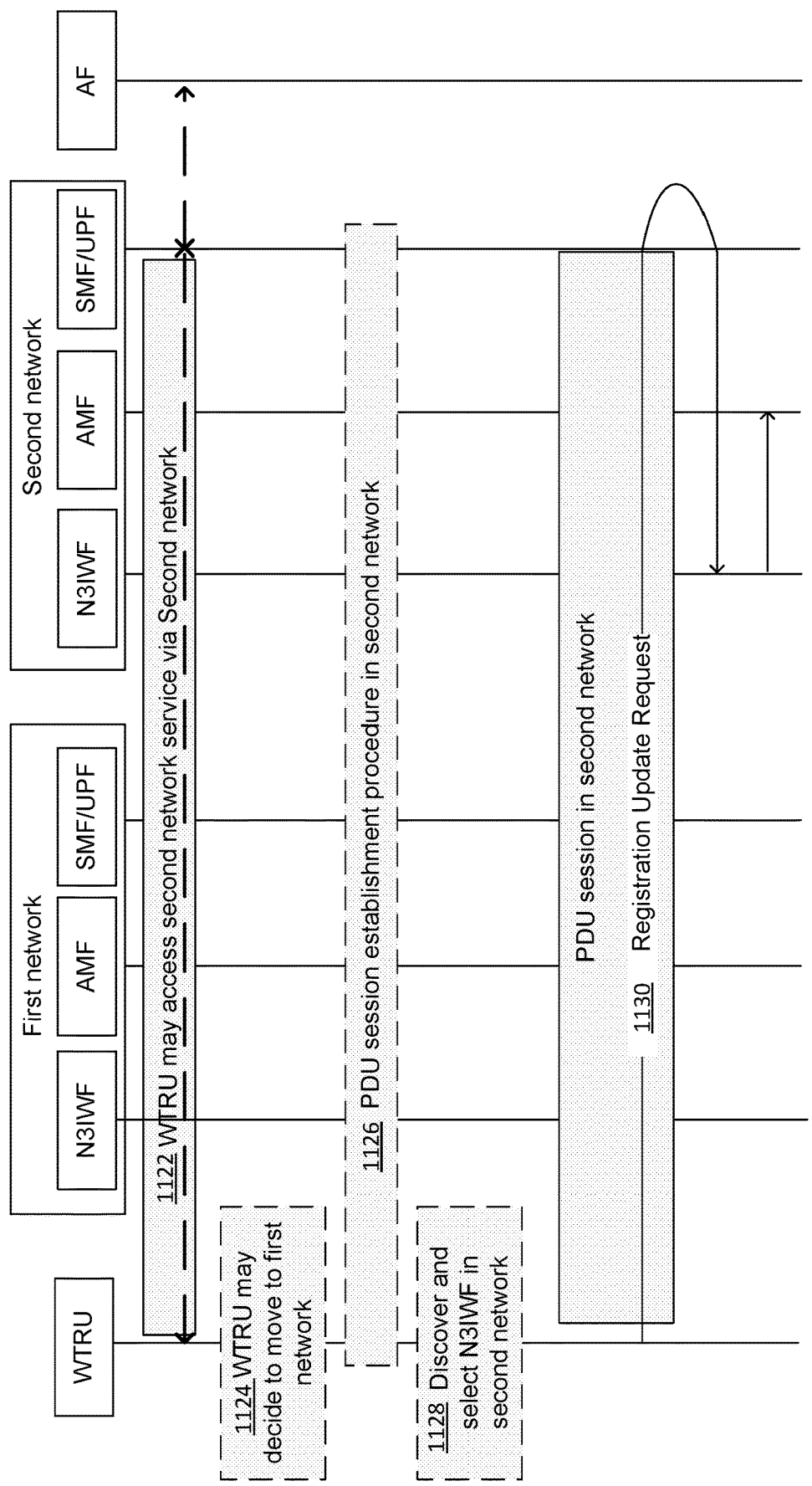
FIG. 11 illustrates an example WTRU mobility procedure from a second network to a first network.
Figure 11B:
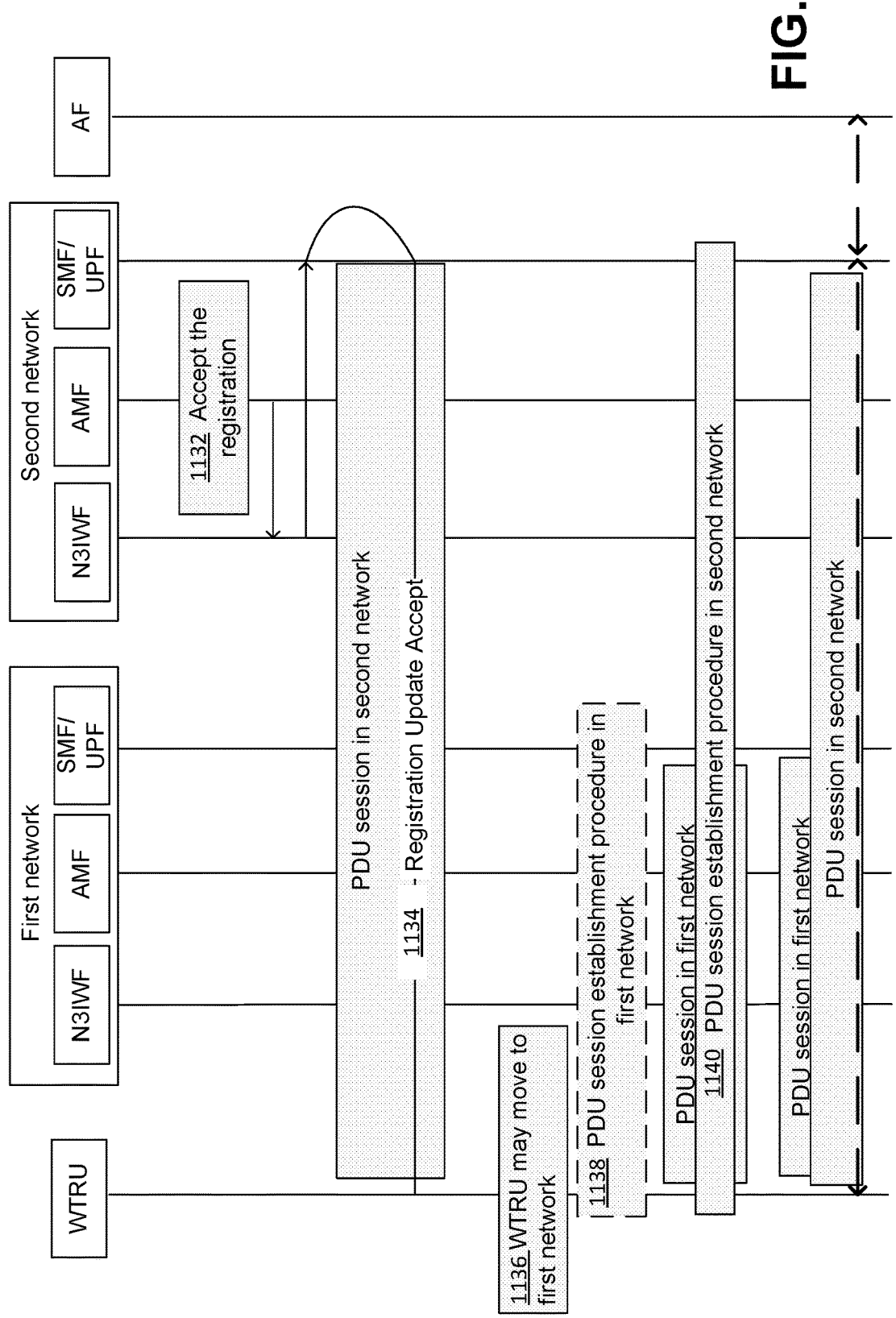

FIG. 11 illustrates an example WTRU mobility procedure from a second network to a first network. As an example, the first network may include an NPN, and the second network may include a PLMN.

An example WTRU mobility procedure from a second network to a first network shown in FIG. 11 may include one or more of the followings.

At 1122, a WTRU may access a second network service via the second network. At 1124, the WTRU may decide to move to a first network. At 1126, the WTRU may establish a PDU session in the second network to establish user plane. At 1128, the WTRU may perform the N3IWF discovery to select N3IWF in the second network. At 1130, the WTRU may send registration update request to N3IWF in the second network. For example, the WTRU may send the registration update request to the N3IWF in the second network via the user plane in the second network. The N3IWF in the second network may forward the request (e.g., the registration update request) to AMF in the second network. At 1132, the AMF in the second network may accept the registration. At 1134, the WTRU may receive an indication for registration update accept from the AMF in the second network. At 1136, the WTRU may move to the first network. At 1138, the WTRU may trigger PDU session establishment procedure to establish user plane in the first network. At 1140, the WTRU may perform PDU session establishment in the second network via the user plane in the first network. If the WTRU performs the PDU session establishment in the second network via the user plane in the first network, the WTRU may continue to communicate with AF.

In certain examples, 1122-1140 as shown in FIG. 11 may be performed in a different order (e.g., in whole or in part), may be skipped, and/or may be replaced with different actions.

QoS flow may be managed by a network and/or a WTRU.

A WTRU may be configured to establish a session with a first network. The session may be established, for example, for transmitting data associated with a second network. The establishment of the session may be triggered by launching of a service and/or an application associated with a second network. The WTRU may send a request to the first network to establish the session with the first network. The session that is established with the first network may be a user plane session. The request may include a session establishment request. The WTRU may send an indication that indicates that the session associated with the first network is for transmission of data associated with the second network that includes control plane data (e.g., signaling) and/or user plane data. The WTRU may send the indication via the request. The indication may be in different forms. The indication may be one or more of an information element in the request message, a data network name (DNN), or a single network slice selection assistance information (S-NS-SAI) value. In an example, the indication may be an always-on indication.

In an example, a PLMN session establishment may be triggered by launching an NPN service/application. If a PLMN session establishment is triggered by launching an NPN service/application, a WTRU may indicate, in the PDU session establishment request, that the PDU session is a session which may serve as a carrier for signaling and/or transmitting data between the WTRU and the NPN. The PLMN session may be a user plane session, for example, a PDU session.

Figure 12:
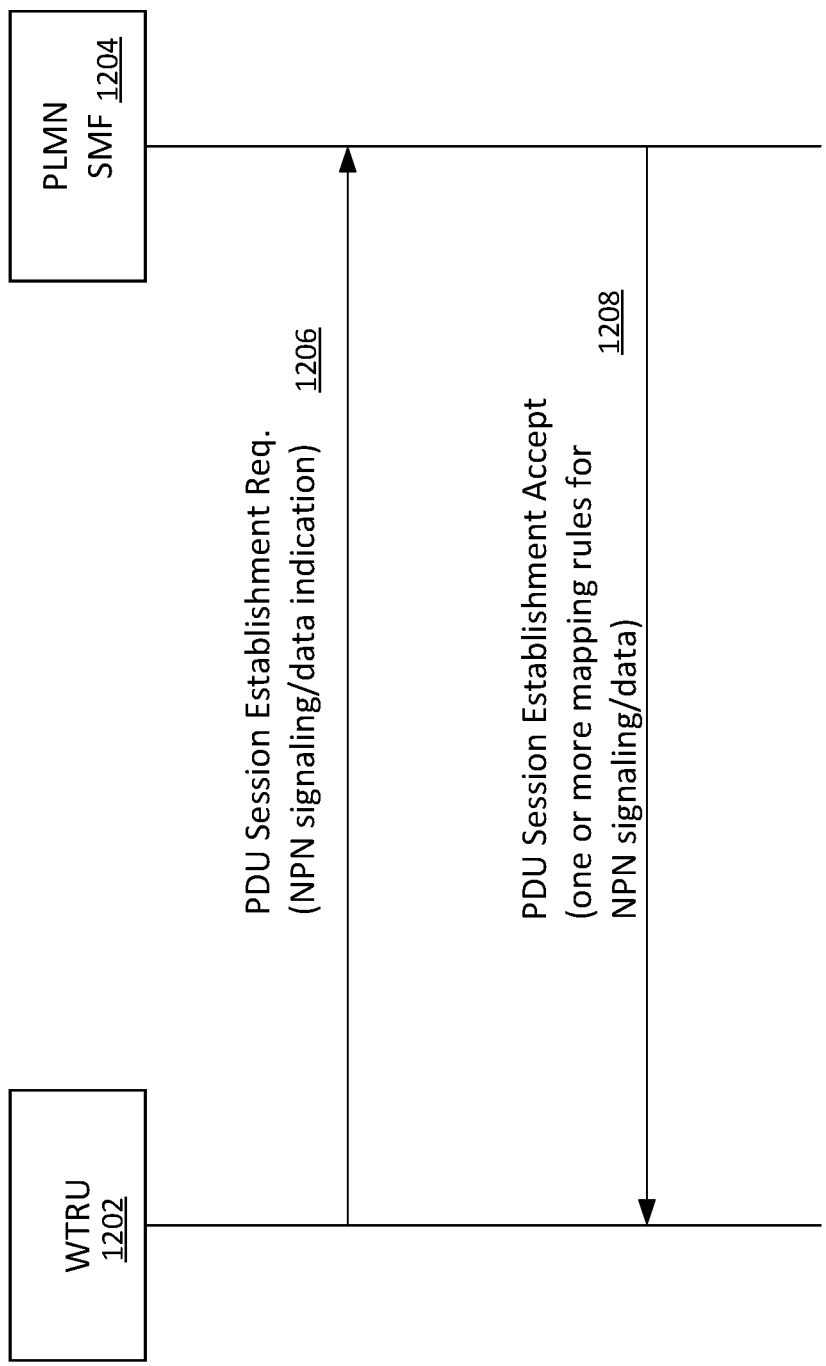
FIG. 12 illustrates an example where a WTRU receives one or more QoS mapping rules.

The WTRU may receive one or more mapping rules. For example, the mapping rules may include QoS mapping rules. The WTRU may receive the one or more QoS mapping rules from an SMF of the first network. The WTRU may receive the one or more QoS mapping rules via a session establishment accept message. FIG. 12 illustrates an example where a WTRU receives one or more QoS mapping rules. As shown in FIG. 12, WTRU 1202 may send a message to and/or receive a message from a PLMN SMF 1204. As shown in FIG. 12, WTRU 1202 may send a PDU session establishment request to PLMN SMF 1204 at 1206. The PDU session establishment request may include an indication. As shown in FIG. 12, the indication may indicate that the PDU session is for transmission of NPN traffic. The NPN traffic may include NPN signaling and/or NPN data (e.g., user plane data). As shown in FIG. 12, WTRU 1202 may receive a PDU session establishment accept from PLMN SMF 1204 at 1208. The PDU session establishment accept may include the one or more QoS mapping rules for NPN signaling/NPN data.

SMF may provide one or more QoS mapping rules to the WTRU. In an example, a PLMN SMF may provide one or more QoS mapping rules to the WTRU in the PDU session accept message. The PLMN SMF may provide the one or more QoS mapping rules to the WTRU in the PDU session accept message upon observing an indication, for example, the indication as described herein.

The WTRU may determine QoS information for data (e.g., packets) that are transmitted via the session of the first network. The WTRU may determine QoS information for PDUs that are transmitted in the first network. In examples, information blocks that are transmitted via the session of the first network may include different data associated with the second network. The data may include user plane data associated with the second network and control plane data associated with the second network.

The QoS information may include QoS indications. The QoS indication(s) may indicate a QoS level(s) associated with certain traffic. For example, the QoS indications may include QoS flow identifiers (QFI). A QFI may indicate a QoS class identifier (QCI) associated with the traffic and additional information. The additional information may include UL/DL guaranteed flow bit rates, for example, for guaranteed bitrate flows. In certain examples, the QFI may correspond to the QCI associated with the traffic. A QFI may be in different forms. The QFI may be an index.

One or more of the following QoS mapping rules may be used to determine QoS information for different data associated with the second network. The one or more QoS mapping rules may be rules that are different from QoS rule(s). In certain examples, the one or more QoS mapping rules may include QoS rule(s). The one or more QoS mapping rules may include first mapping information for the control plane data associated with the second network and the second mapping information for the user plane data associated with the second network. The WTRU may use the first mapping information to assign the first QoS indication for a first packet for transmission in the first network. The first packet may include the control plane data associated with the second network. The WTRU may use the second mapping information to assign the second QoS indication for a second packet for transmission in the first network. The second packet of the first session may include the user plane data associated with the second network.

A QoS mapping rule may provide a pre-determined QoS indication(s) for control plane data associated with the second network (e.g., signaling data associated with the second network). The QoS mapping rule may provide a fixed QoS indication(s) for the control plane data associated with the second network. The pre-determined QoS indication(s) and/or the fixed QoS indication(s) may be associated with the first network. The pre-determined QoS indication may be for control plane data associated with the second network including NAS signaling associated with the second network and/or the corresponding IPSec SA. The fixed QoS indication may be for control plane data associated with the second network including NAS signaling associated with the second network and/or the corresponding IPSec SA. The QoS indication may include a QFI.

A QoS mapping rule may provide a pre-determined QoS indication(s) for user plane data associated with the second network. The QoS mapping rule may provide a fixed QoS indication(s) for the user plane data associated with the second network. The pre-determined QoS indication(s) and/or the fixed QoS indication(s) may be associated with the first network. In examples, the QoS mapping rule may provide a pre-determined QoS indication(s) for all user plane data associated with the second network. The QoS mapping rule may provide a pre-determined QoS indication(s) for one or more QoS flows that carry user plane data associated with the second network. In an example, the QoS mapping rule may provide a fixed QoS indication(s) for all user plane data associated with the second network. The QoS mapping rule may provide a fixed QoS indication(s) for one or more QoS flows that carry user plane data associated with the second network.

A QoS mapping rule may provide a mapping of a QoS indication(s) that is used in the first network to a QoS indication(s) that is used in the second network. In examples, different user plane data associated with the second network may correspond to certain QoS indications that are available in the second network. A WTRU may determine QoS indications that are used in the first network for the different user plane data associated with the second network based on the mapping rule.

A QoS mapping rule may provide a default QoS indication(s) that is applicable to the first network. If the one or more QoS mapping rules are not available or a predetermined QoS indication(s) is not provided in the one or more QoS mapping rules, the WTRU may use the default QoS indication(s). For example, the default QoS indication(s) may be provided by the one or more QoS mapping rule. A default QoS indication(s) may be reconfigured or hard-coded, for example, in the software. If the one or more QoS mapping rules are not available or a predetermined QoS indication(s) is not provided in the one or more QoS mapping rules, the WTRU may use the local QoS configuration to determine a QoS indication(s).

A QoS mapping rule may provide other information that maps a corresponding QoS indication used in the first network to data associated with the second network.

A WTRU may be configured to determine a QoS indication based on one or more QoS mapping rules, for example, for a packet that is transmitted via a session of the first network.

A WTRU may be configured to determine (e.g., assign) a QoS indication based on one or more QoS mapping rules, for example, for a packet that contains control plane data associated with the second network. In an example, a WTRU may establish an NAS connection with the second network. If a WTRU tries to establish an NAS connection with the second network and initiates internet key exchange (IKE) procedures to create a signaling IPSec SA for the NAS connection, the WTRU may check one or more of the QoS mapping rules. A mapping rule may provide a pre-determined QoS indication(s) for control plane data associated with the second network. Based on the QoS mapping rule, the WTRU may map (e.g., assign) the pre-determined QoS indication(s) to one or more packets containing control plane data associated with the second network. The WTRU may mark the packets containing the control plane data associated with the second network with the pre-determined QoS indication(s) indicated by the QoS mapping rule.

Figure 13:
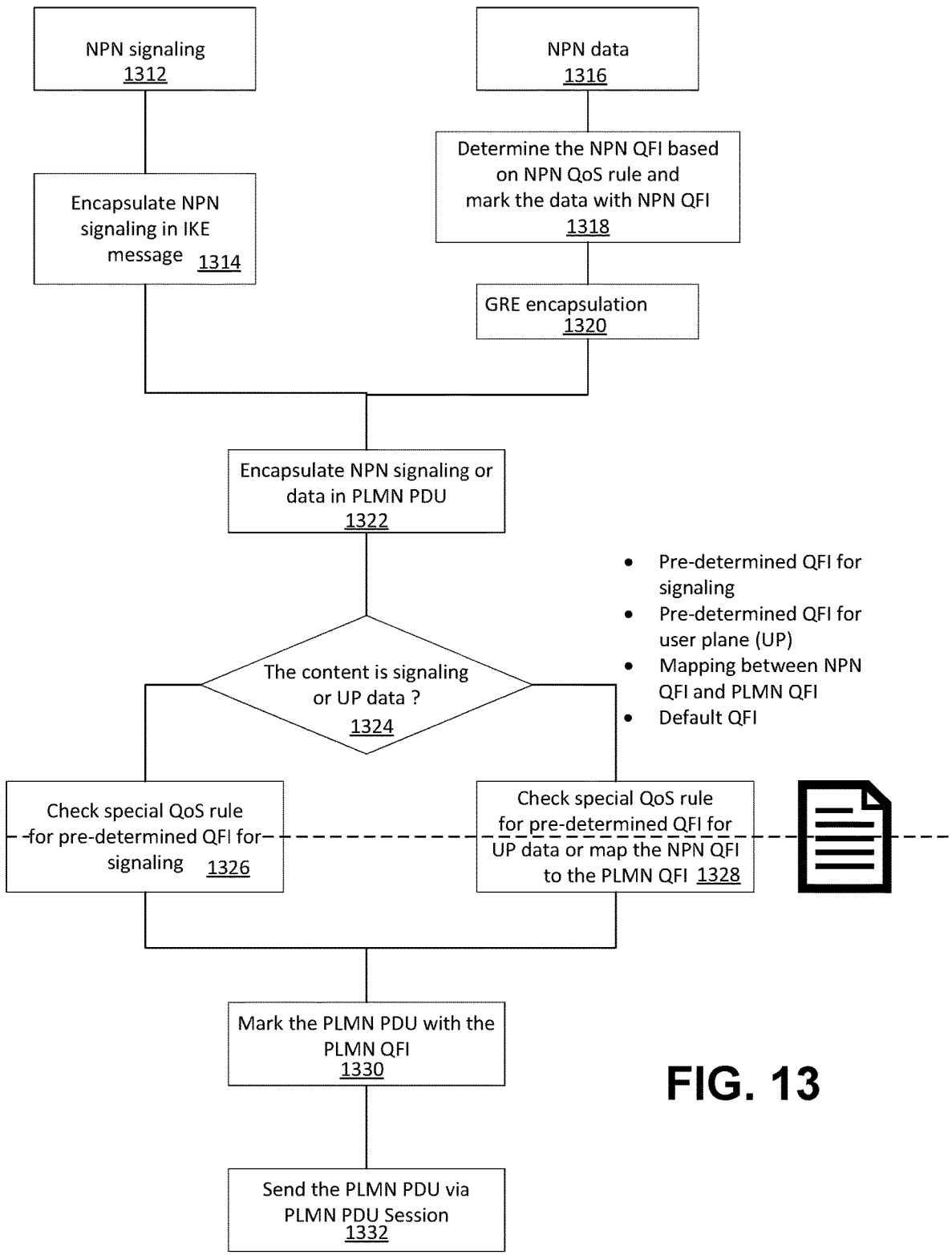
FIG. 13 illustrates an example where a WTRU may determine PLMN QoS indication(s) for NPN control plane data/user plane data.

FIG. 13 illustrates an example where a WTRU may determine PLMN QoS indication(s) for NPN control plane data/user plane data. As shown in FIG. 13, a WTRU may have NPN signaling to transmit at 1312. The WTRU may encapsulate NPN signaling in an internet key exchange (IKE) message(s) a 1314. The IKE message, which may include the NPN signaling, may be adapted to form a packet that is to be transmitted in PLMN. As shown in FIG. 13, the WTRU may encapsulate IKE messages that contain NPN signaling in a PLMN PDU (packet) at 1322. At 1324, the WTRU may determine, for a packet, whether the packet contains signaling or user plane data. The WTRU may check the one or more QoS mapping rules of the PLMN PDU session at 1326.

The one or more QoS mapping rule may include a mapping rule that provides a pre-determined QFI for a packet containing NPN signaling. Based on the mapping rule, the WTRU may determine a QFI for the packet containing NPN signaling to be the pre-determined QFI. The WTRU may mark one or more (e.g., all) packets that contain the NPN signaling with the pre-determined PLMN QFI indicated by the mapping rule. If the one or more QoS mapping rules are not available or the PLMN QFI for NPN signaling traffic is not provided in the one or more QoS mapping rules, the WTRU may use the default PLMN QFI (e.g., provided by the one or more QoS mapping rules). If the one or more QoS mapping rules are not available or the PLMN QFI for NPN signaling traffic is not provided in the one or more QoS mapping rules, the WTRU may use the local QoS configuration to determine the PLMN QFI for NPN signaling.

In the downlink direction, the first network may mark a packet using a QoS indication that indicates the packet contains control plane data associated with the second network. In the downlink direction, a WTRU may receive a packet from UPF associated with a first network. The UPF associated with the first network may receive IP packets, for example, from N3IWF in the second network. In an example, in a downlink direction, the PLMN UPF may receive IP packets from the NPN N3IWF. The IP packets may include a generic routing encapsulation (GRE) encapsulated NPN signaling. An IP header field (e.g., differentiated services code point (DSCP)) may be used to indicate that the content is for signaling. Based on the indication in the IP header, the PLMN UPF may mark the packets with a proper QFI(s) indicating that the packet is for signaling. The proper QFI for signaling may be determined according to local policy and/or configuration. The local policy and/or configuration may be in line with one or more QoS mapping rules, for example, the QoS mapping rules as provided to the WTRU for UL QoS control in one or more examples herein.

A WTRU may be configured to determine (e.g., assign) a QoS indication based on one or more QoS mapping rules, for example, for a packet that contains the user plane data associated with the second network. The packet that contains user plane data associated with the second network may be transmitted via a session of the first network. In an example, if a WTRU has UL data associated with the second network to send, the WTRU may use QoS rules associated with the second network or reflective QoS rules to determine a QoS indication(s) that is available in the second network for the UL data associated with the second network. The WTRU may mark the UL data associated with the second network using the QoS indication(s) that is available in the second network. The WTRU may encapsulate the UL data associated with the second network in a packet that is recognizable in the first network. The WTRU may check one or more QoS mapping rules to determine the QoS indication(s) that is used in the first network for the packet that is transmitted via the session of the first network.

As shown in FIG. 13, the WTRU may have UL data for NPN to send at 1316. The NPN data may comprise user plane data. If the WTRU has UL data for NPN to send, the WTRU may use the NPN-provided QoS rules and/or reflective QoS rules to determine the NPN QFI at 1318. The WTRU may mark the NPN data with the NPN QFI at 1318. The WTRU may encapsulate the NPN data inside a GRE packet at 1320. The GRE packet may be forwarded to an NPN N3IWF (e.g., via the corresponding IPSec SA). The GRE packet, which may include the NPN UL data, may be adapted to form a packet that is to be transmitted in PLMN. As shown in FIG. 13, the GRE packet may be encapsulated in a PLMN PDU at 1322. The GRE packet may be transmitted via the PLMN PDU session. At 1324, the WTRU may determine, for a packet, whether the packet contains signaling or user plane data. The WTRU may check one or more QoS mapping rules, to determine the PLMN QFI for the PDU containing NPN UL data at 1328.

A QoS mapping rule may indicate a pre-determined QoS indication(s) for one or more (e.g., all) UP traffic. The pre-determined QoS indication(s) may be applicable to the first network. A PDU that is transmitted in the first network may contain UL data associated with the second network. The WTRU may map the pre-determined QoS indication(s) to one or more PDUs containing the UP traffic. As shown in FIG. 13, the WTRU may check the mapping rule to determine PLMN QFI for one or more (e.g., all) PLMN PDUs containing NPN UP traffic at 1328.

The WTRU may mark a packet(s) using the predetermined QoS indication(s) based on the one or more QoS mapping rules. As shown in FIG. 13, at 1330, the WTRU may mark the PLMN PDU containing the NPN UL data. If the mapping rule indicates that a pre-determined PLMN QFI for one or more (e.g., all) UP traffic, the PLMN QFI may be used to mark the PLMN PDU, for example, regardless what NPN QFI applies to the traffic inside a NPN packet.

A QoS mapping rule may indicate mapping between a QoS indication(s) used in the first network and a QoS indication(s) used in the second network. As described herein, the WTRU may determine the QoS indication(s) that is available in the second network using the QoS rules associated with the second network or the reflective QoS rules. The WTRU may determine the QoS indication(s) available in the first network based on the mapping rule that indicates the mapping between the QoS indication(s) associated with the first network and the QoS indication(s) associated with the second network. In an example, if the mapping rule provides a mapping between the NPN QFI and the PLMN QFI, the WTRU may be able to derive the PLMN QFI based on the NPN QFI. As shown in FIG. 13, the WTRU may map the NPN QFI to the PLMN QFI. The NPN QFI may have already been determined. One or more NPN QoS flows, which may use the same IPSec SA, may be mapped to different PLMN QoS flows. The mapping between NPN QoS flows to IPSec SAs may be controlled by the NPN N3IWF. The NPN QoS flow to PLMN QoS flow mapping may be controlled by the PLMN.

A QoS mapping rule may indicate a default QoS indication(s) associated with the first network. If a pre-determined QoS indication(s) and mapping between a QoS indication(s) used in the first network and a QoS indication(s) used in the second network is not available, the WTRU may use the default QoS indication(s) associated with the first network or fall back to use local configurations (e.g., if available). In an example, if a pre-determined PLMN QFI for UP is not available or the mapping between NPN QFI and PLMN QFI is not available, the WTRU may use the default QFI and/or fall back to use the local configuration if available.

A WTRU may be configured to determine a QoS indication based on local configurations. In an example, if a WTRU does not obtain a QoS rule from the PLMN for NPN signaling and/or data, the WTRU may rely on local configuration to determine the QFIs. The local configuration may provide a pre-determined QFI for NPN signaling and/or NPN data or a mapping between the NPN QFI and PLMN QFI.

A WTRU may be configured to determine a QoS indication used in the first network based on a QoS indication used in the second network. In an example, a WTRU may directly use the NPN QFI of a NPN packet for the PLMN packet that carries the NPN packet.

A WTRU may send a packet containing the control plane data associated with the second network via a session of the first network. A WTRU may send a packet containing the user plane data associated with the second network via a session of the first network. As shown in FIG. 13, at 1332, the WTRU may send the PLMN PDU via PLMN PDU session.

One of ordinary skill in the art will appreciate that one or more of 1312-1332 as shown in FIG. 13 may be performed in a different order (e.g., in whole or in part), may be skipped, and/or may be replaced with different actions.

The procedures described herein may be based on the example illustrated in FIG. 5. One of ordinary skill in the art will appreciate that the procedures described herein may be applied to the example illustrated in FIG. 4. For example, the first network may be NPN and the second network may be PLMN.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
send a request to a first network to establish a first session with the first network for transmission of data associated with a second network, the data associated with the second network comprising control plane data and user plane data;
receive quality of service (QoS) mapping rules for assigning QoS indications to transmissions in the first network that comprise the data associated with the second network, wherein the QoS mapping rules comprise first QoS mapping information for the control plane data and second QoS mapping information for the user plane data;
assign a first QoS indication to a first packet for transmission in the first network using the first QoS mapping information based on the first packet comprising control plane data associated with the second network;
assign a second QoS indication to a second packet for transmission in the first network using the second QoS mapping information based on the second packet comprising user plane data associated with the second network; and
send the first packet and the second packet via the first session associated with the first network.

2. The WTRU of claim 1, wherein the first session is a user plane session associated with the first network.

3. The WTRU of claim 1, wherein the first QoS mapping information for the control plane data comprises a predetermined QoS indication to be applied to a packet comprising control plane data associated with the second network.

4. The WTRU of claim 1, wherein the second QoS mapping information for the user plane data comprises individual mapping rules for mapping QoS indications for a second session of the second network to QoS indications for the first session of the first network.

5. The WTRU of claim 1, wherein the user plane data associated with the second network and the control plane data associated with the second network is encapsulated in packets for transmission via the first session of the first network.

6. The WTRU of claim 1, wherein the first packet and the second packet comprise protocol data units (PDUs).

7. The WTRU of claim 1, wherein the first network comprises a public land mobile network (PLMN), and the second network comprises a non-public network (NPN).

8. The WTRU of claim 7, wherein the first session is a PLMN session, and the QoS mapping rules comprise rules for mapping an NPN QoS flow indicator (QFI) of an NPN session to a PLMN QFI of the PLMN session.

9. The WTRU of claim 1, wherein the request comprises an explicit indication that the first session is for the transmission of the data associated with the second network.

10. The WTRU of claim 1, wherein the second QoS mapping information for the user plane data comprises a predetermined QoS indication to be applied to a packet comprising user plane data associated with the second network.

11. The WTRU of claim 1, wherein the QoS mapping rules comprise a default QoS indication to be applied to a packet comprising control plane data associated with the second network.

12. The WTRU of claim 1, wherein the request is sent to a session management function of the first network.

13. The WTRU of claim 1, wherein the request is a session request message, and the QoS mapping rules are received via a session establishment message.

14. A method comprising:
sending a request to a first network to establish a first session with the first network for transmission of data associated with a second network, the data associated with the second network comprising control plane data and user plane data;
receiving quality of service (QoS) mapping rules for assigning QoS indications to transmissions in the first network that comprise the data associated with the second network, wherein the QoS mapping rules comprise first QoS mapping information for the control plane data and second QoS mapping information for the user plane data;

assigning a first QoS indication to a first packet for transmission in the first network using the first QoS mapping information based on the first packet comprising control plane data associated with the second network;

assigning a second QoS indication to a second packet for transmission in the first network using the second QoS mapping information based on the second packet comprising user plane data associated with the second network; and sending the first packet and the second packet via the first session associated with the first network.

15. The method of claim 14, wherein the first session is a user plane session associated with the first network, and the request comprises an explicit indication that the first session is for the transmission of the data associated with the second network.

16. The method of claim 14, wherein the first QoS mapping information for the control plane data comprises a predetermined QoS indication to be applied to a packet comprising control plane data associated with the second network.

17. The method of claim 14, wherein the second QoS mapping information for the user plane data comprises individual mapping rules for mapping QoS indications for a second session of the second network to QoS indications for the first session of the first network.

18. The method of claim 14, wherein the first network comprises a public land mobile network (PLMN), the second network comprises a non-public network (NPN), and the first session is a PLMN session, wherein the QoS mapping rules comprise rules for mapping an NPN QoS flow indicator (QFI) of an NPN session to a PLMN QFI of the PLMN session.

19. The method of claim 14, wherein the second QoS mapping information for the user plane data comprises a predetermined QoS indication to be applied to a packet comprising user plane data associated with the second network.

20. The method of claim 14, wherein the QoS mapping rules comprise a default QoS indication to be applied to a packet comprising control plane data associated with the second network.

* * * * *